United States Patent
Kodaira et al.

(10) Patent No.: US 7,907,355 B2
(45) Date of Patent: Mar. 15, 2011

(54) ZOOM LENS SYSTEM AND CAMERA INCLUDING THE SAME

(75) Inventors: Masakazu Kodaira, Utsunomiya (JP); Tsuyoshi Wakazono, Utsunomiya (JP); Masaru Sakamoto, Utsunomiya (JP); Ryuji Nurishi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 12/467,950

(22) Filed: May 18, 2009

(65) Prior Publication Data
US 2009/0290229 A1 Nov. 26, 2009

(30) Foreign Application Priority Data
May 21, 2008 (JP) ................................ 2008-132928

(51) Int. Cl.
*G02B 9/36* (2006.01)
(52) U.S. Cl. ........................................ 359/775
(58) Field of Classification Search .................. 359/688, 359/735, 775
See application file for complete search history.

(56) References Cited

U.S. PATENT DOCUMENTS

| 4,927,250 A | 5/1990 | Suda |
| 5,677,792 A | 10/1997 | Hamano |
| 6,002,528 A * | 12/1999 | Tomita .......................... 359/684 |

FOREIGN PATENT DOCUMENTS

| JP | 61-223819 A | 10/1986 |
| JP | 07-104218 A | 4/1995 |
| JP | 08-015648 A | 1/1996 |
| JP | 11-101941 A | 4/1999 |
| JP | 2001-021804 A | 1/2001 |

* cited by examiner

*Primary Examiner* — Joseph Martinez
(74) *Attorney, Agent, or Firm* — Canon U.S.A., Inc. I.P. Division

(57) ABSTRACT

A zoom lens system includes, in order from the object side to the image side, four lens units having positive, negative, negative and positive refractive powers. A first lens unit includes, in order from the object side to the image side: a front subunit having a negative refractive power; a middle subunit that has a positive refractive power and moves during focusing; and a rear subunit having a positive refractive power. The zoom lens system further includes a variable apex angle prism disposed on the image side of the front subunit. An average Abbe number of materials of a negative lens element and a positive lens element included in the front subunit is set appropriately so as to suppress occurrence of decentering aberration accompanying a variation of a prism apex angle.

8 Claims, 31 Drawing Sheets

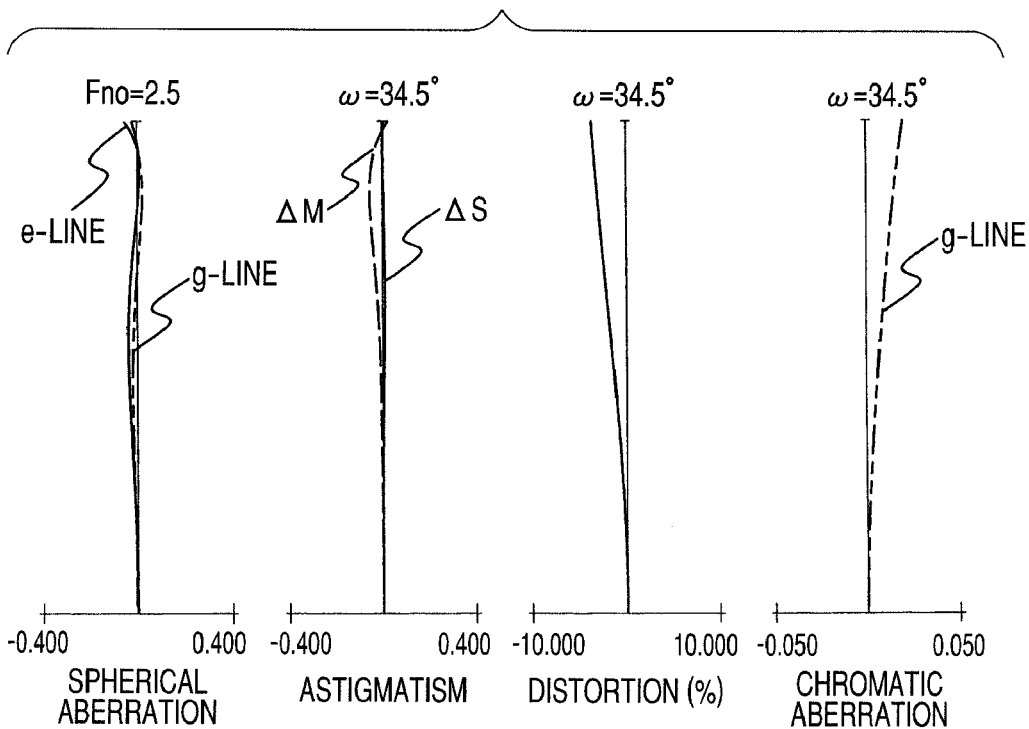
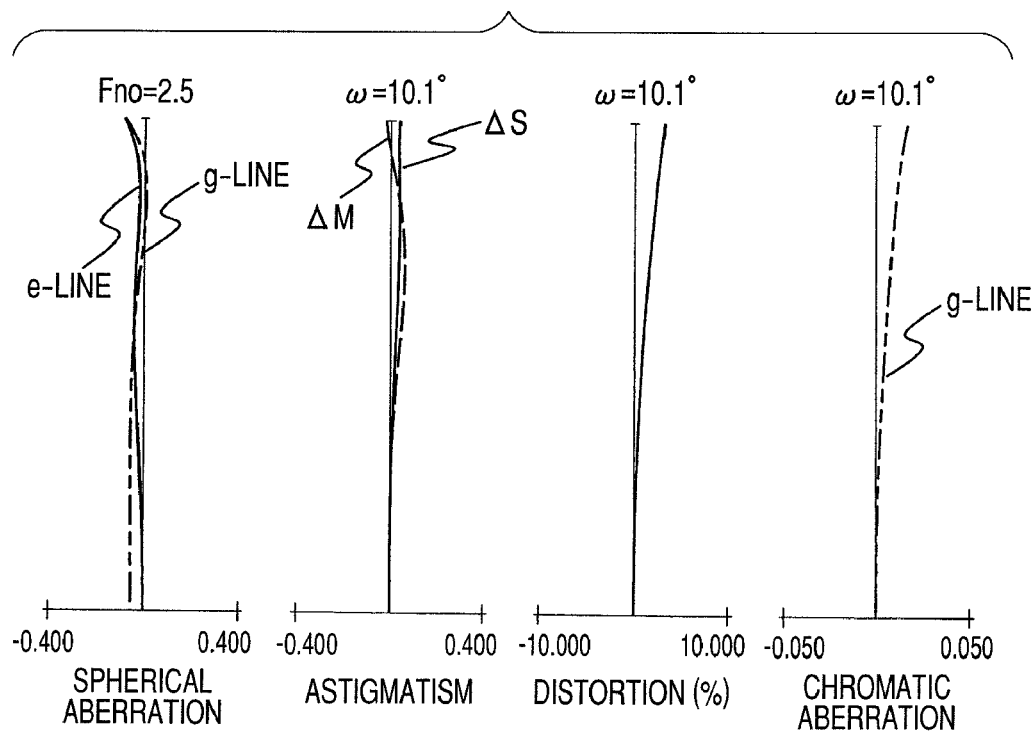

ZOOM LENS SYSTEM AND CAMERA INCLUDING THE SAME

BACKGROUND OF THE INVENTION

1. Field of the Invention

The present invention relates to a zoom lens system and a camera including the same.

2. Description of the Related Art

In an image pickup optical system (a shooting optical system) used in a camera such as a TV camera, a digital still camera, and a video camera, a small and lightweight zoom lens system which has a large aperture, a wide field angle, a high zoom ratio, and high optical performance over an entire zoom range and an entire object distance range is demanded.

In addition, a zoom lens system having an image stabilization function of reducing (compensating for) shot image blurring caused from a shake when shooting by a camera carried on a shoulder or a vibration when shooting by a camera mounted on a vehicle or the like is demanded.

Conventionally, there is known a zoom lens system having the image stabilization function of compensating for the shot image blurring. A variable apex angle prism having a variable prism apex angle is disposed in an optical path of the zoom lens system. When the zoom lens system oscillates, the prism apex angle is changed according to the oscillation for compensating for the shot image blurring (see Japanese Patent Application Laid-Open No. S61-223819 (corresponding to U.S. Pat. No. 4,927,250), Japanese Patent Application Laid-Open No. H11-101941, Japanese Patent Application Laid-Open No. H07-104218 (corresponding to U.S. Pat. No. 5,677,792), and Japanese Patent Application Laid-Open No. H08-015648).

In general, if the method of changing the prism apex angle of the variable apex angle prism for compensating for the shot image blurring is used, a decentering aberration occurs in the zoom lens system by the variation of the prism apex angle when the image stabilization function is activated. Therefore, image quality is apt to deteriorate when the image stabilization function is activated.

There is known a paper concerning the decentering aberration caused by the image stabilization function, which is handled based on an aberration theory (Optical Society of Japan, Nineteenth Optical Symposium Proceedings, Lecture No. 17).

In general, the method of changing the prism apex angle of the variable apex angle prism for compensating for the shot image blurring has a merit that the shot image blurring can be compensated relatively quickly and easily even if the vibration and the shot image blurring are large.

However, there is a tendency that a decentering aberration may frequently occur corresponding to the variation of the prism apex angle of the variable apex angle prism, and hence the image quality deteriorates significantly. Therefore, it is important to set appropriately a structure of the variable apex angle prism and a position of the variable apex angle prism in the optical path, in particular, structure of lens units disposed before and after the variable apex angle prism, in order that the image stabilization is performed quickly and that the decentering aberration generated in the image stabilization process is reduced.

If those structures are not appropriate, a decentering aberration may frequently occur when the image stabilization function is activated, and hence image quality deteriorates significantly when the image stabilization function is activated.

SUMMARY OF THE INVENTION

It is an object of the present invention to provide a zoom lens system capable of suppressing the decentering aberration caused by the variation of the prism apex angle when the variable apex angle prism is used for performing the image stabilization so that a high quality image can be obtained even when the image stabilization function is activated.

An exemplary zoom lens system according to the present invention includes, in order from an object side to an image side: a first lens unit that has a positive optical power and does not move for zooming; a second lens unit that has a negative optical power and moves during the zooming; a third lens unit that has a negative optical power and moves during the zooming; and a fourth lens unit that has a positive optical power and does not move for the zooming. Further, the first lens unit includes, in order from the object side to the image side: a front subunit that has a negative optical power and does not move for focusing; a middle subunit that has a positive optical power and moves for the focusing; and a rear subunit that has a positive optical power and does not move for the focusing. The first lens unit further includes a variable apex angle prism on the image side of the front subunit. In this zoom lens system, an average Abbe number of materials of a negative lens element and a positive lens element included in the front subunit is appropriately set.

Further features of the present invention become apparent from the following description of exemplary embodiments with reference to the attached drawings.

BRIEF DESCRIPTION OF THE DRAWINGS

FIGS. 2A, 2B and 2C are longitudinal aberration charts at the wide angle end, at a middle zoom position, and at a telephoto end for an infinite object according to Embodiment 1 of the present invention.

DESCRIPTION OF THE EMBODIMENTS

Hereinafter, embodiments of the present invention are described in detail with reference to the attached drawings.

A zoom lens system of the present invention includes the following lens units in order from the object side to the image side. The zoom lens system includes a first lens unit that has a positive refractive power (corresponding to the optical power which is an inverse number of a focal length) and does not move for zooming, a second lens unit that has a negative refractive power and moves during zooming, a third lens unit that has a negative refractive power and moves during zooming, and a fourth lens unit that has a positive refractive power and does not move for zooming.

The first lens unit includes a front subunit that has a negative refractive power and does not move for focusing, a middle subunit that has a positive refractive power and moves for focusing, and a rear subunit that has a positive refractive power and does not move for focusing, which are disposed in this order from the object side to the image side. Further, a variable apex angle prism having a variable prism apex angle is disposed on the image side of the front subunit in the first lens unit.

The variable apex angle prism is disposed between the middle subunit and the rear subunit or in the rear subunit.

Figure 1:
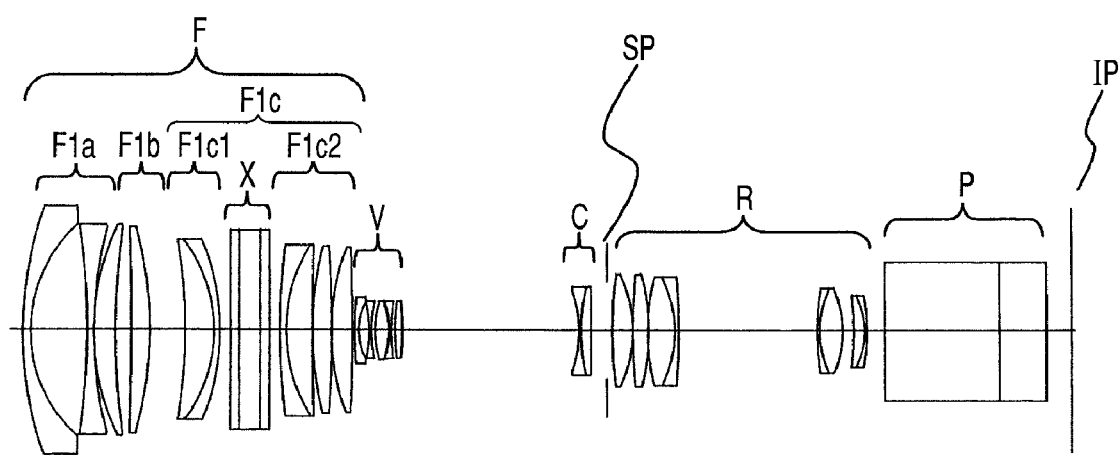
FIG. 1 is a lens cross section at a wide angle end according to Embodiment 1 of the present invention.

FIG. 1 is a lens cross section at a wide angle end according to Embodiment 1 of the present invention.

Figure 2C:
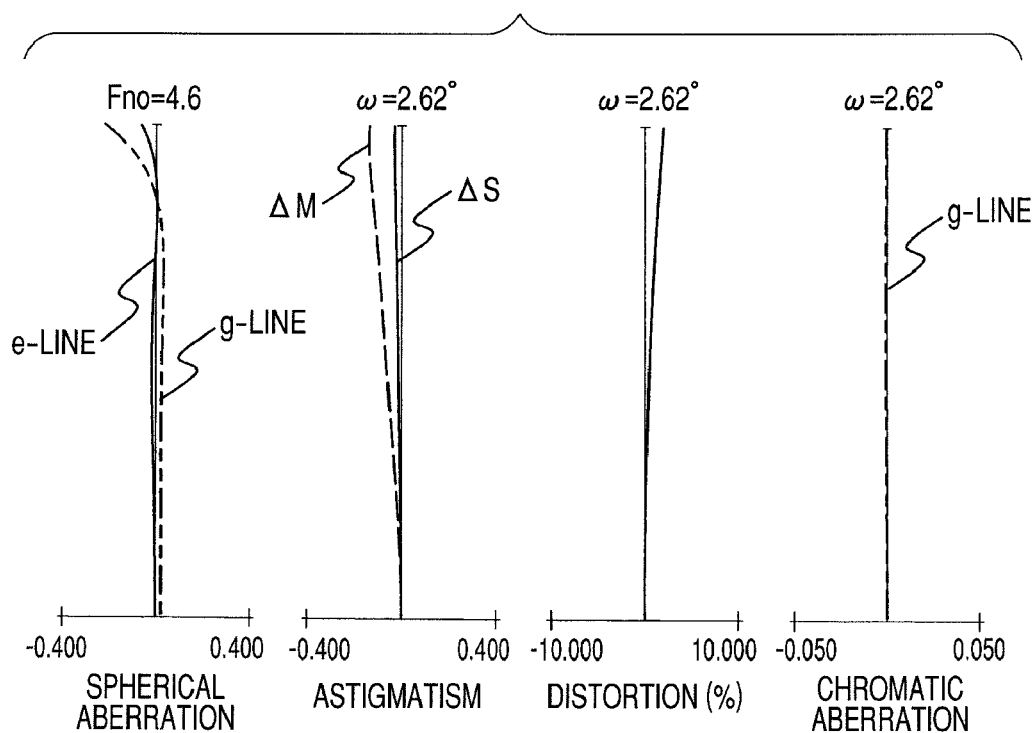

FIGS. 2A, 2B and 2C are longitudinal aberration charts at the wide angle end (f=8 mm), at a middle zoom position (f=30.98 mm), and at a telephoto end (f=120 mm) for an infinite object according to Embodiment 1 of the present invention.

Figure 3:
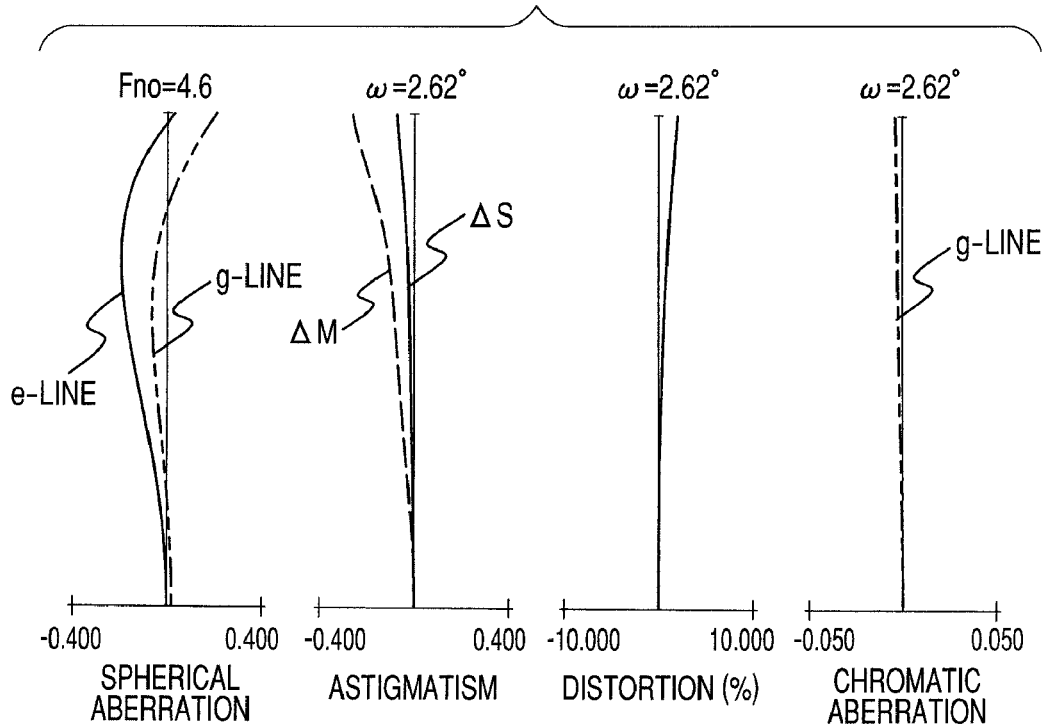
FIG. 3 is a longitudinal aberration chart at the telephoto end for an object in close proximity according to Embodiment 1 of the present invention.

FIG. 3 is a longitudinal aberration chart at the telephoto end (f=120 mm) for an object in close proximity (0.8 m) according to Embodiment 1 of the present invention.

Figure 4A:
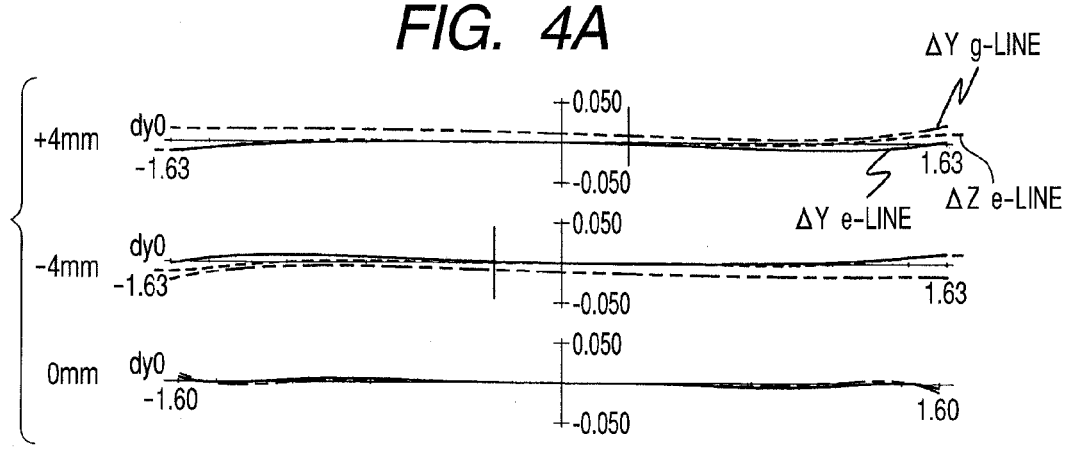
FIGS. 4A, 4B and 4C are lateral aberration charts at the wide angle end, at the middle zoom position, and at the telephoto end for the infinite object according to Embodiment 1 of the present invention.
Figure 4B:
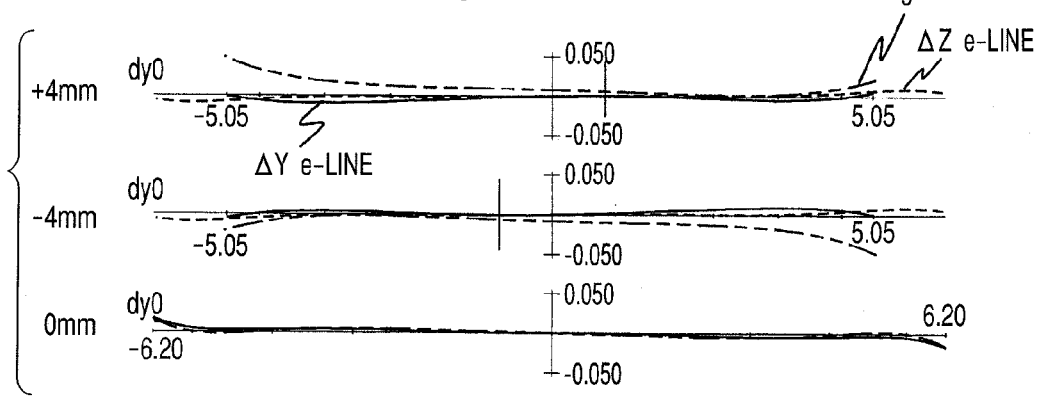
Figure 4C:
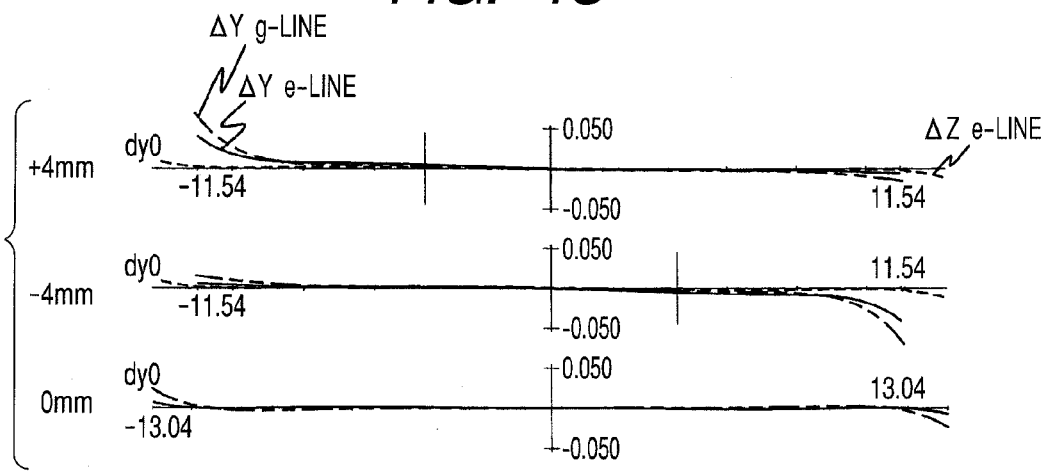

FIGS. 4A, 4B and 4C are lateral aberration charts at the wide angle end (f=8 mm), at the middle zoom position (f=30.98 mm), and at the telephoto end (f=120 mm) for the infinite object according to Embodiment 1 of the present invention.

Figure 5:
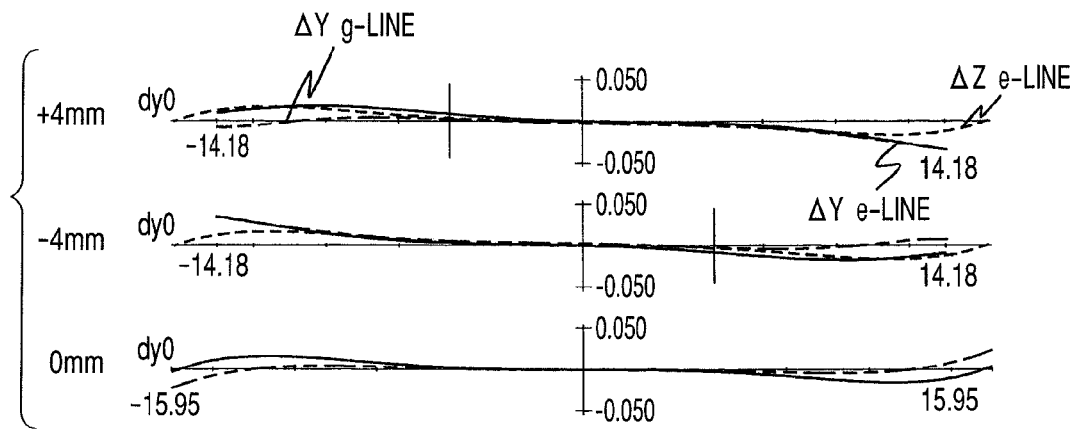
FIG. 5 is a lateral aberration chart at the telephoto end for the object in close proximity according to Embodiment 1 of the present invention.

FIG. 5 is a lateral aberration chart at the telephoto end (f=120 mm) for the object in close proximity (0.8 m) according to Embodiment 1 of the present invention.

Figure 6A:
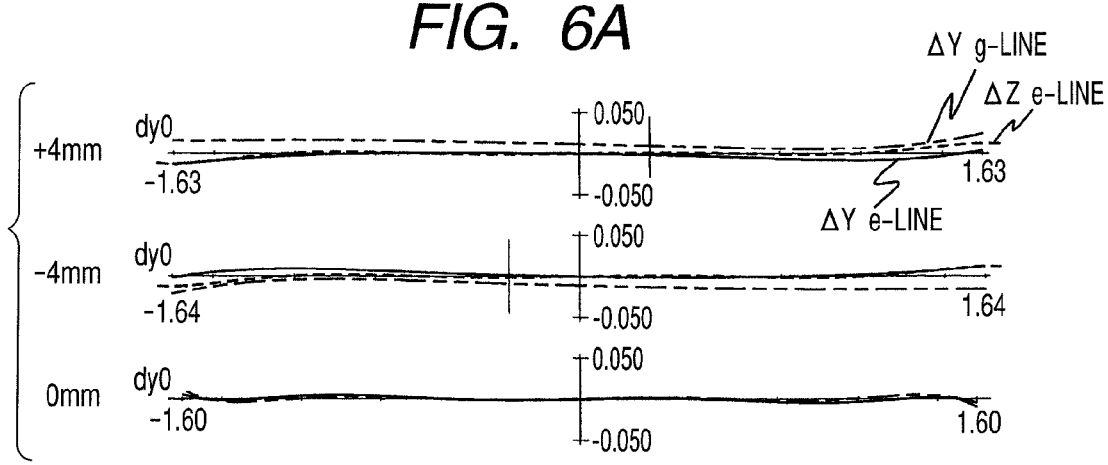
FIGS. 6A, 6B and 6C are lateral aberration charts at the wide angle end, at the middle zoom position, and at the telephoto end for the infinite object when a prism apex angle of a variable apex angle prism is 0.3 degrees according to Embodiment 1 of the present invention.
Figure 6B:
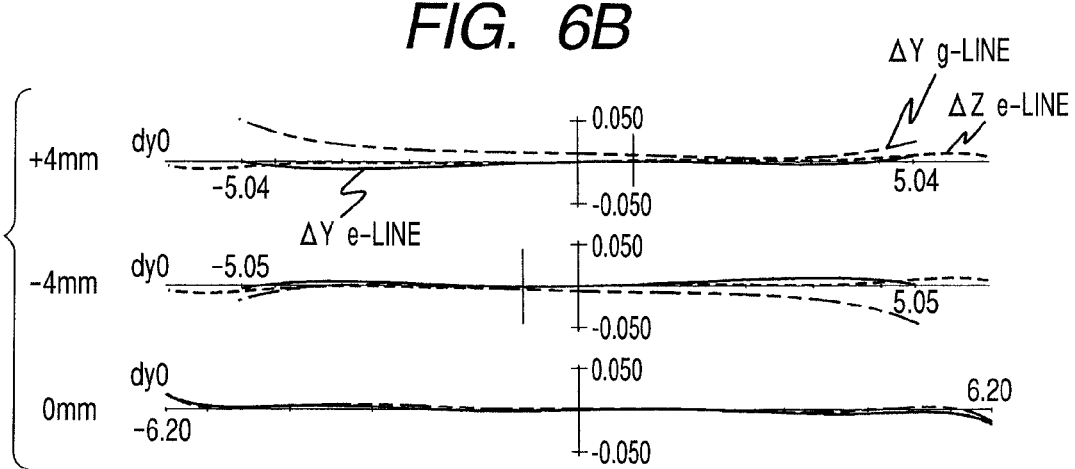
Figure 6C:
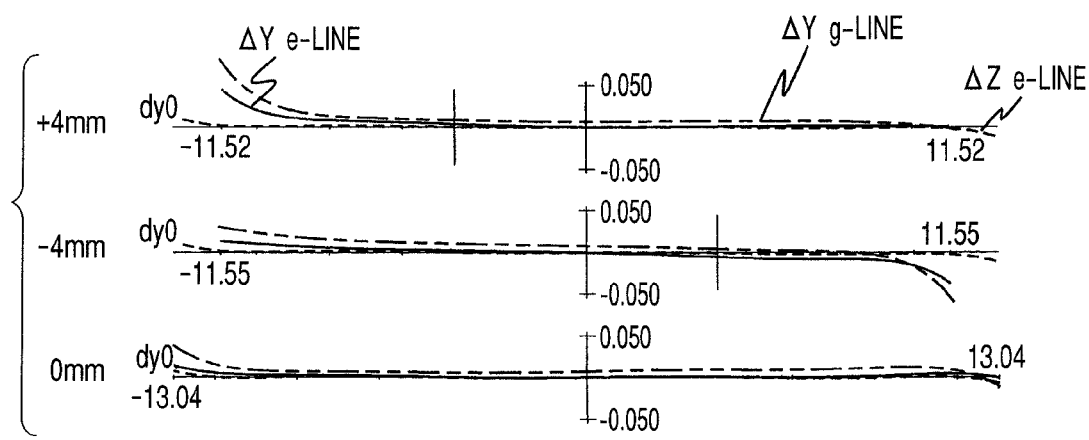

FIGS. 6A, 6B and 6C are lateral aberration charts at the wide angle end (f=8 mm), at the middle zoom position (f=30.98 mm), and at the telephoto end (f=120 mm) when the prism apex angle of the variable apex angle prism is 0.3 degrees according to Embodiment 1 of the present invention.

Figure 7:
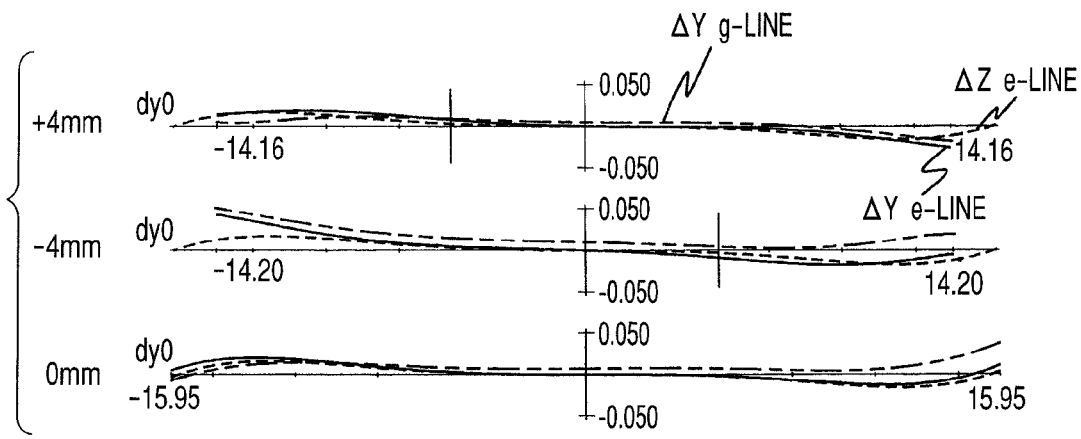
FIG. 7 is a lateral aberration chart at the telephoto end for the object in close proximity when the prism apex angle of the variable apex angle prism is 0.3 degrees according to Embodiment 1 of the present invention.

FIG. 7 is a lateral aberration chart at the telephoto end (f=120 mm) for the object in close proximity (0.8 m) when the prism apex angle of the variable apex angle prism is 0.3 degrees according to Embodiment 1 of the present invention.

Figure 8:
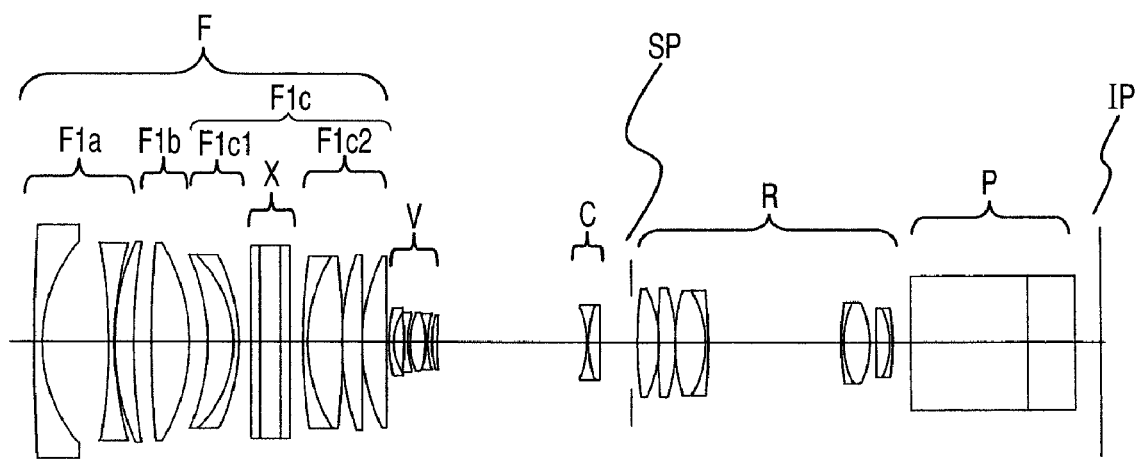
FIG. 8 is a lens cross section at a wide angle end according to Embodiment 2 of the present invention.

FIG. 8 is a lens cross section at a wide angle end according to Embodiment 2 of the present invention.

Figure 9A:
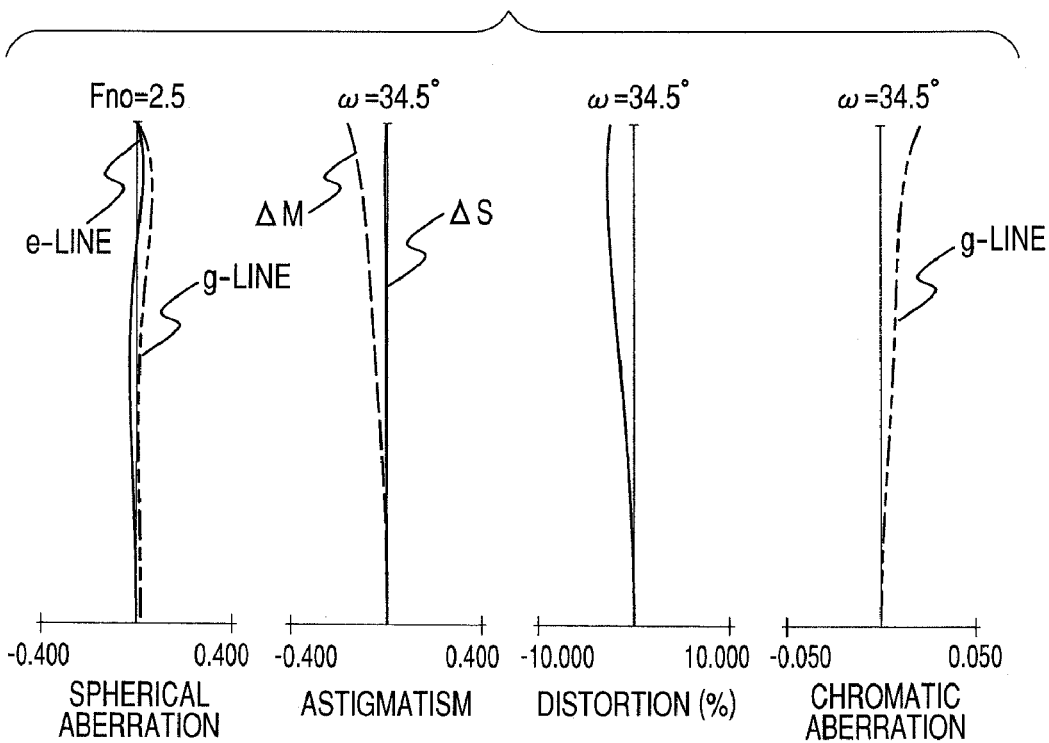
FIGS. 9A, 9B and 9C are longitudinal aberration charts at the wide angle end, at a middle zoom position, and at a telephoto end for an infinite object according to Embodiment 2 of the present invention.
Figure 9B:
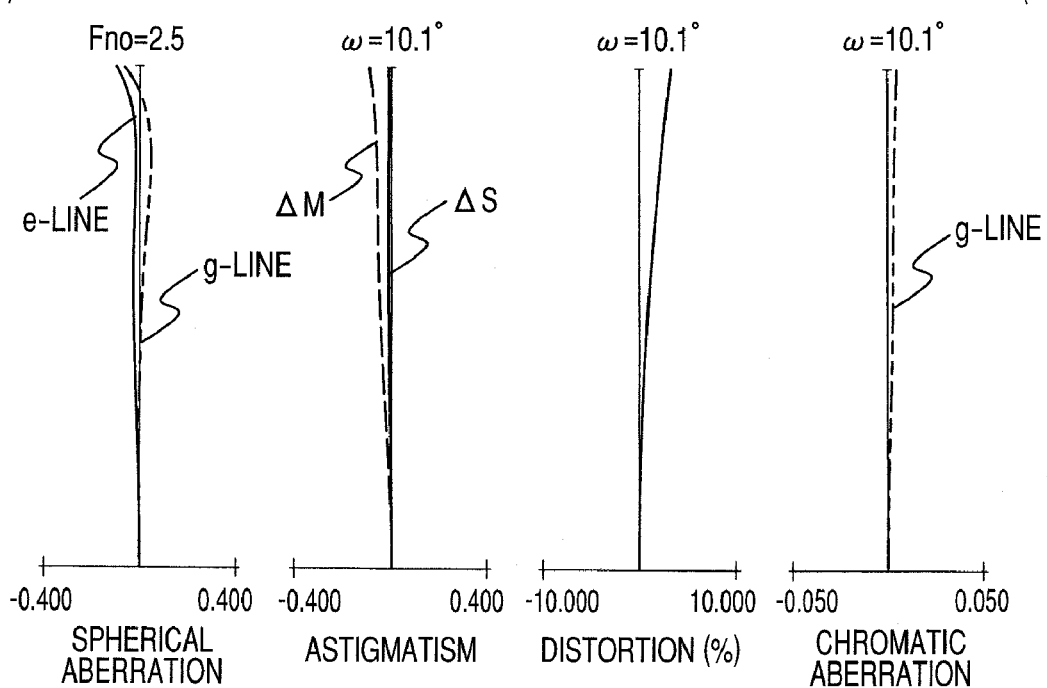
Figure 9C:
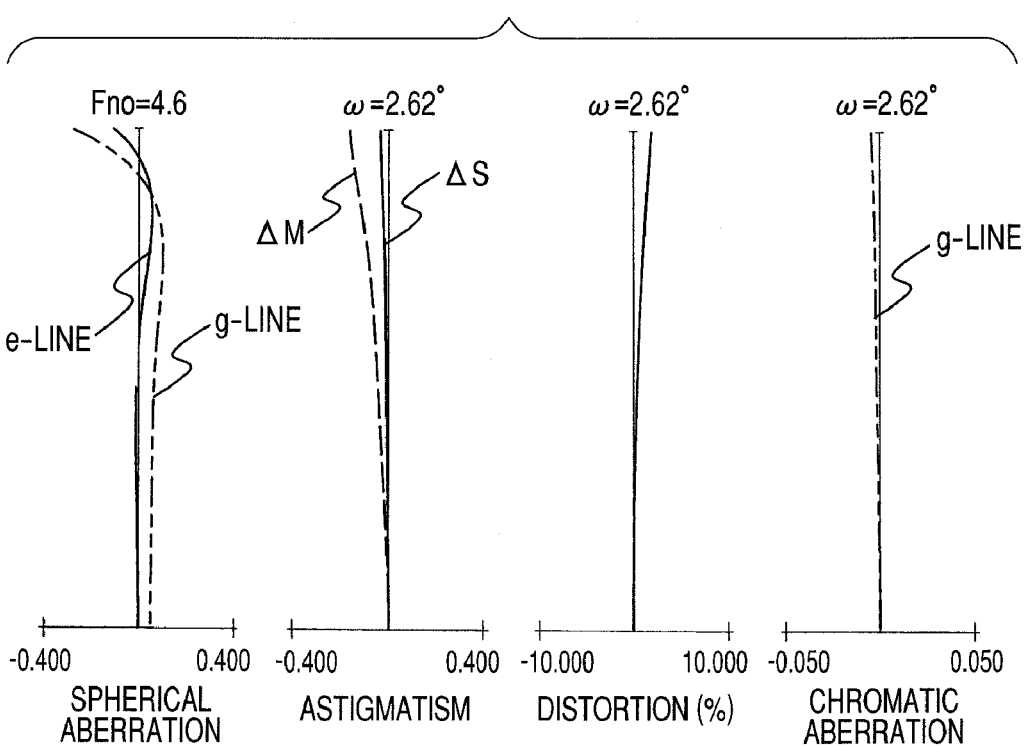

FIGS. 9A, 9B and 9C are longitudinal aberration charts at the wide angle end (f=8 mm), at a middle zoom position (f=30.98 mm), and at a telephoto end (f=120 mm) for an infinite object according to Embodiment 2 of the present invention.

Figure 10:
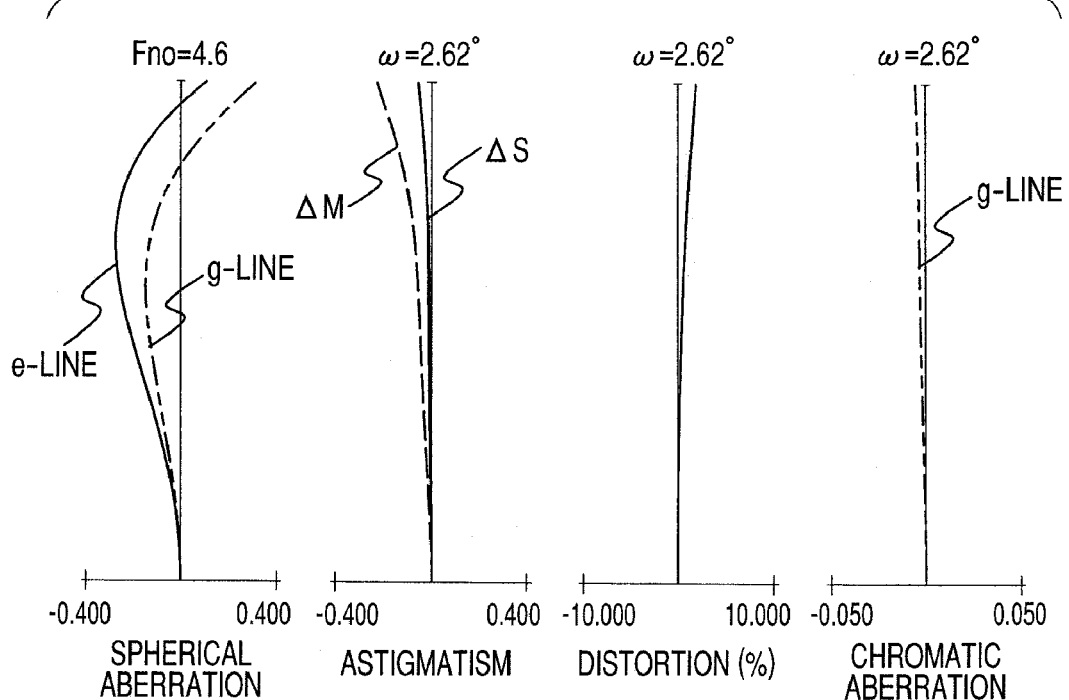
FIG. 10 is a longitudinal aberration chart at the telephoto end for an object in close proximity according to Embodiment 2 of the present invention.

FIG. 10 is a longitudinal aberration chart at the telephoto end (f=120 mm) for an object in close proximity (0.8 m) according to Embodiment 2 of the present invention.

Figure 11A:
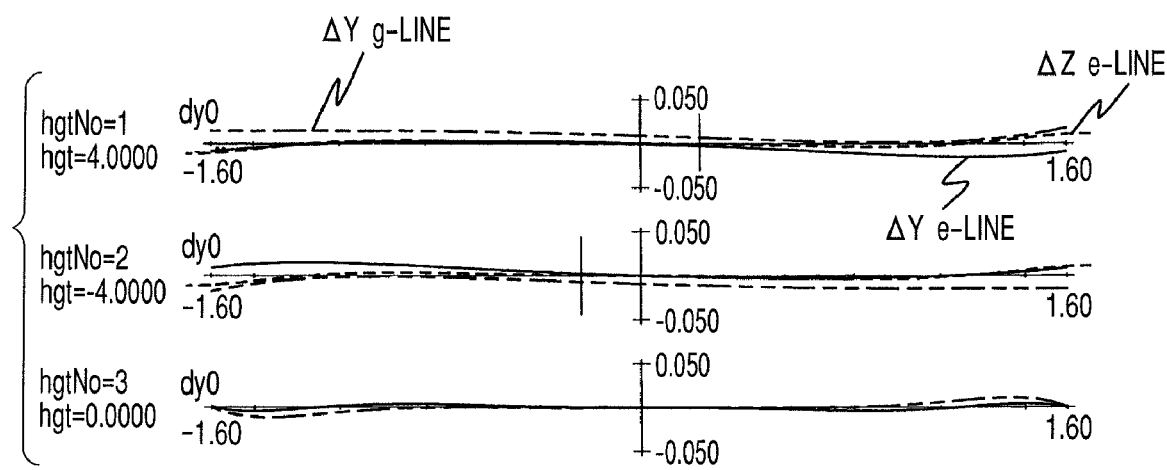
FIGS. 11A, 11B and 11C are lateral aberration charts at the wide angle end, at the middle zoom position, and at the telephoto end for the infinite object according to Embodiment 2 of the present invention.
Figure 11B:
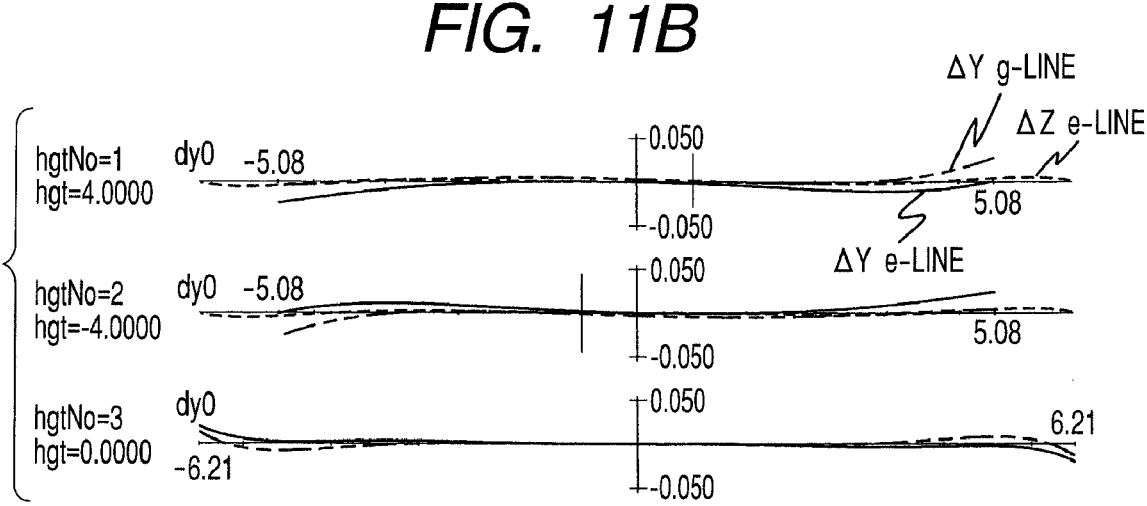
Figure 11C:
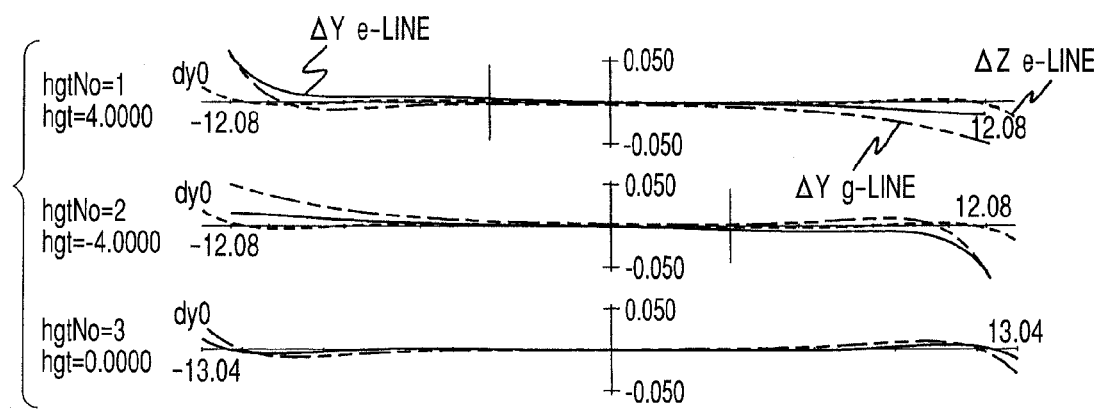

FIGS. 11A, 11B and 11C are lateral aberration charts at the wide angle end (f=8 mm), at the middle zoom position (f=30.98 mm), and at the telephoto end (f=120 mm) for the infinite object according to Embodiment 2 of the present invention.

Figure 12:
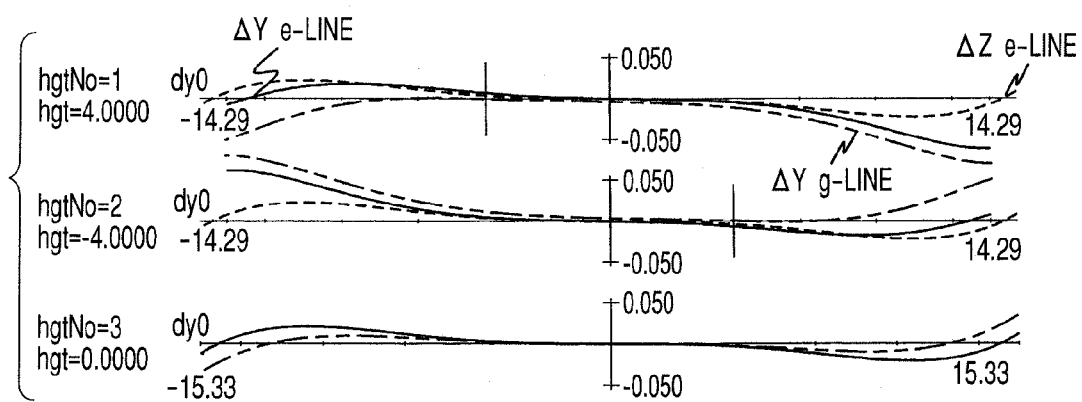
FIG. 12 is a lateral aberration chart at the telephoto end for the object in close proximity according to Embodiment 2 of the present invention.

FIG. 12 is a lateral aberration chart at the telephoto end (f=120 mm) for the object in close proximity (0.8 m) according to Embodiment 2 of the present invention.

Figure 13A:
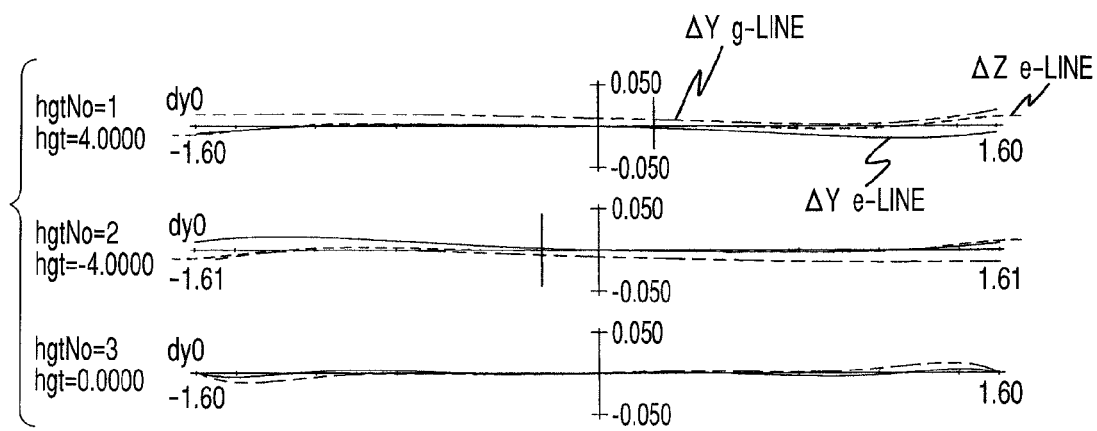
FIGS. 13A, 13B and 13C are lateral aberration charts at the wide angle end, at the middle zoom position, and at the telephoto end for the infinite object when a prism apex angle of a variable apex angle prism is 0.28 degrees according to Embodiment 2 of the present invention.
Figure 13B:
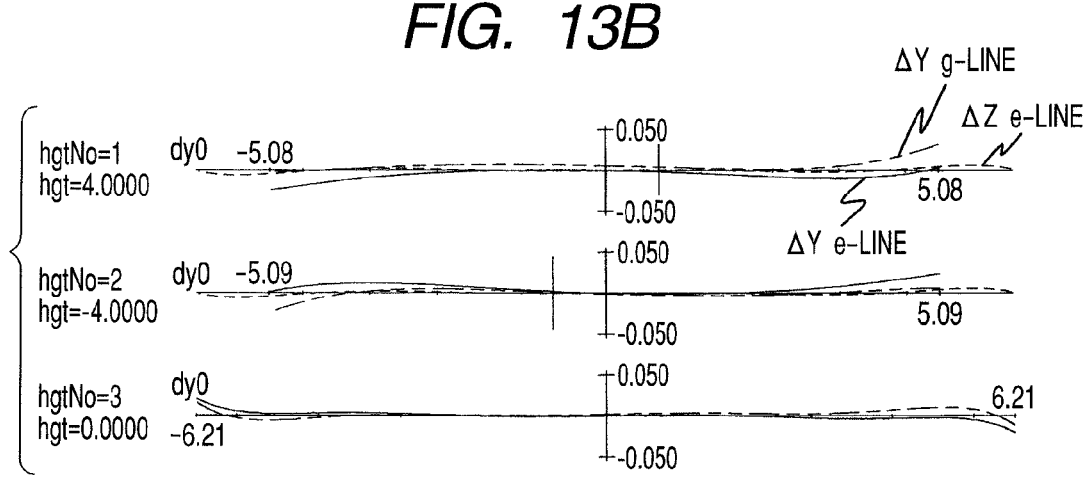
Figure 13C:
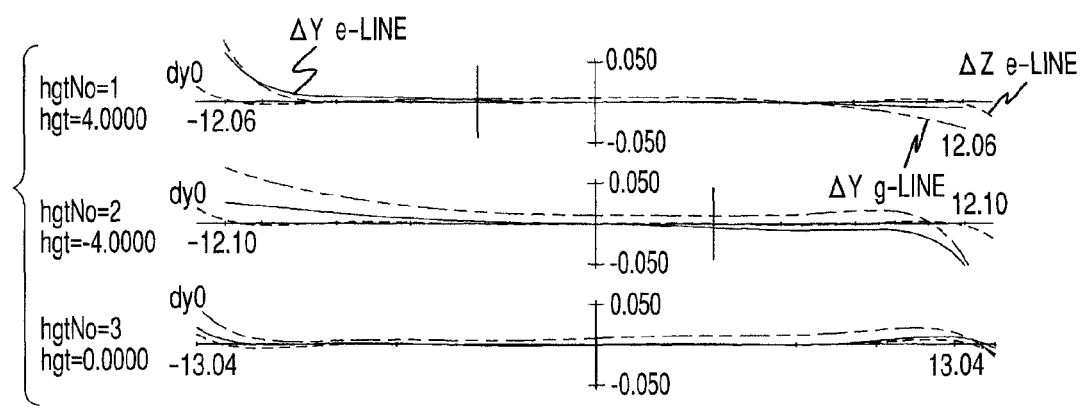

FIGS. 13A, 13B and 13C are lateral aberration charts at the wide angle end (f=8 mm), at the middle zoom position (f=30.98 mm), and at the telephoto end (f=120 mm) when the prism apex angle of the variable apex angle prism is 0.28 degrees according to Embodiment 2 of the present invention.

Figure 14:
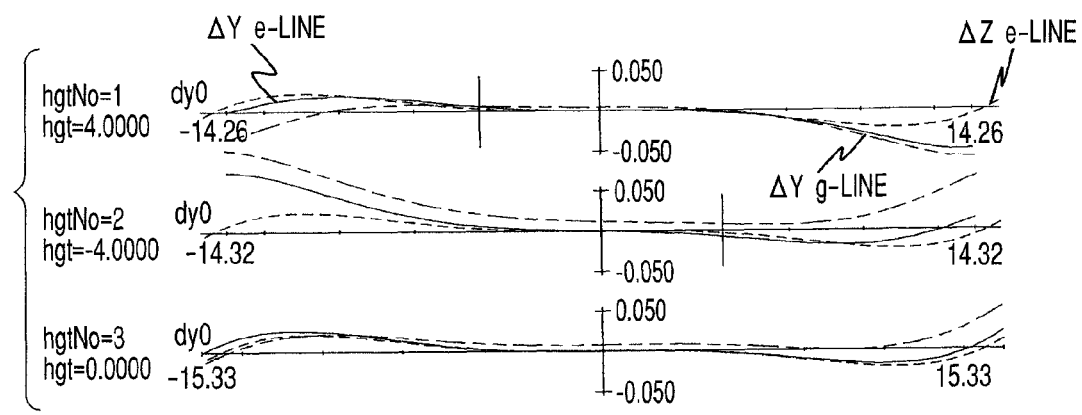
FIG. 14 is a lateral aberration chart at the telephoto end for the object in close proximity when the prism apex angle of the variable apex angle prism is 0.28 degrees according to Embodiment 2 of the present invention.

FIG. 14 is a lateral aberration chart at the telephoto end (f=120 mm) for the object in close proximity (0.8 m) when the prism apex angle of the variable apex angle prism is 0.28 degrees according to Embodiment 2 of the present invention.

Figure 15:
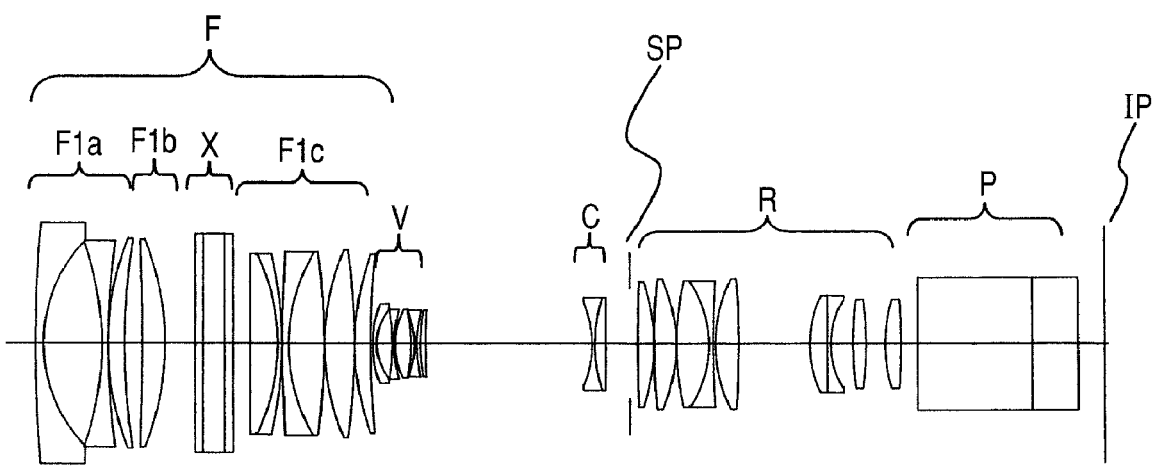
FIG. 15 is a lens cross section at a wide angle end according to Embodiment 3 of the present invention.

FIG. 15 is a lens cross section at a wide angle end according to Embodiment 3 of the present invention.

Figure 16A:
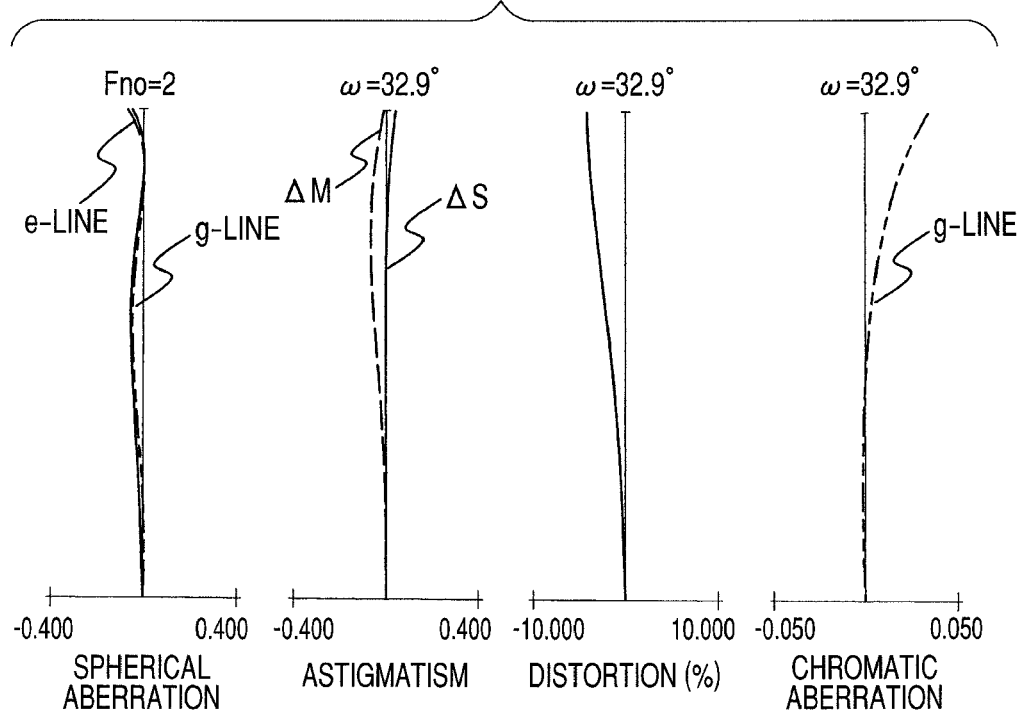
FIGS. 16A, 16B and 16C are longitudinal aberration charts at the wide angle end, at a middle zoom position, and at a telephoto end for an infinite object according to Embodiment 3 of the present invention.
Figure 16B:
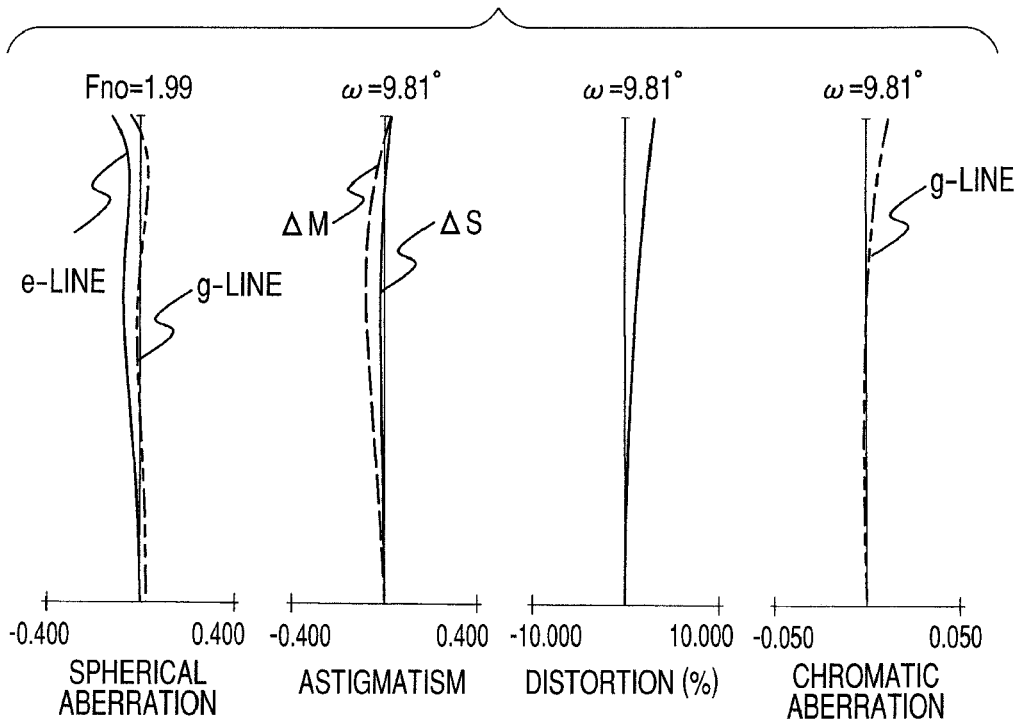
Figure 16C:
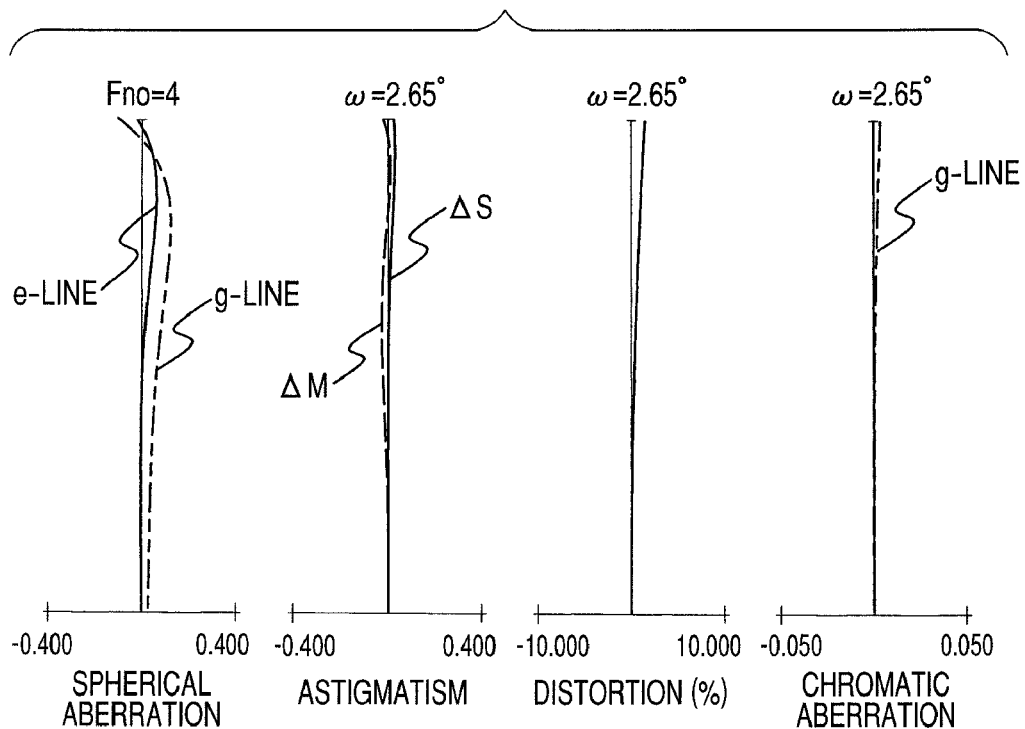

FIGS. 16A, 16B and 16C are longitudinal aberration charts at the wide angle end (f=8.5 mm), at a middle zoom position (f=31.81 mm), and at a telephoto end (f=119 mm) for an infinite object according to Embodiment 3 of the present invention.

Figure 17:
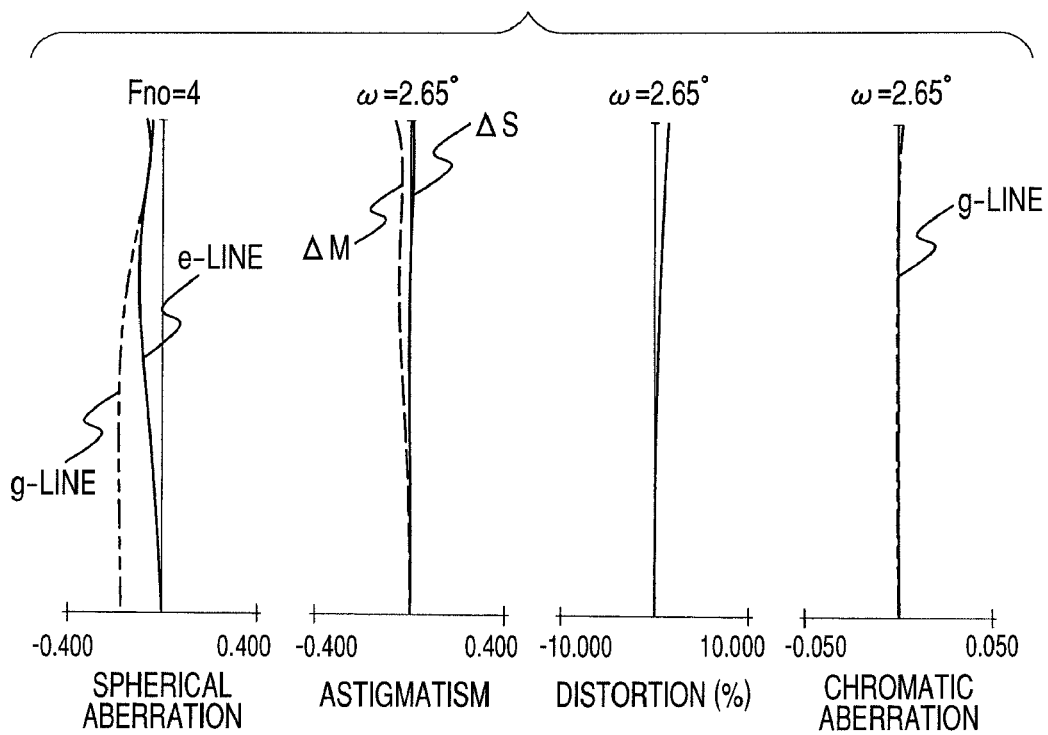
FIG. 17 is a longitudinal aberration chart at the telephoto end for an object in close proximity according to Embodiment 3 of the present invention.

FIG. 17 is a longitudinal aberration chart at the telephoto end (f=119 mm) for an object in close proximity (0.8 m) according to Embodiment 3 of the present invention.

Figure 18A:
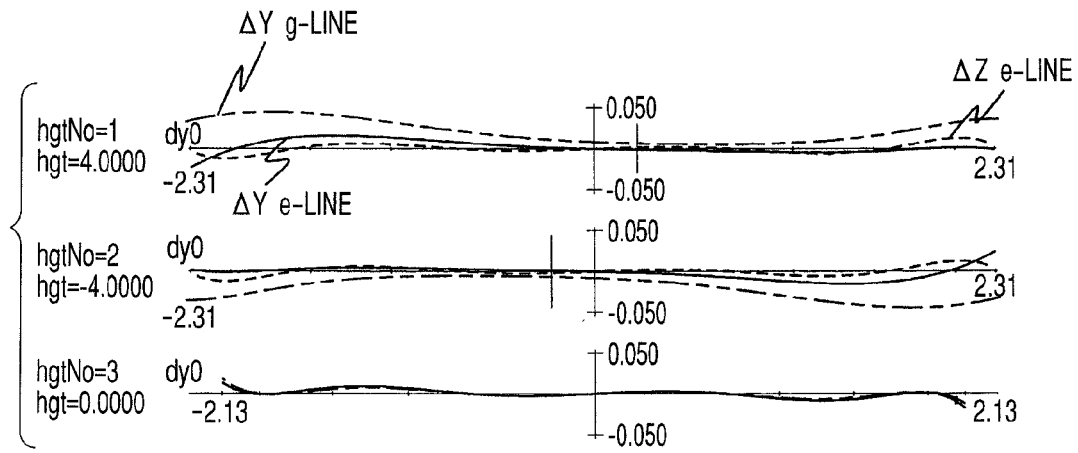
FIGS. 18A, 18B and 18C are lateral aberration charts at the wide angle end, at the middle zoom position, and at the telephoto end for the infinite object according to Embodiment 3 of the present invention.
Figure 18B:
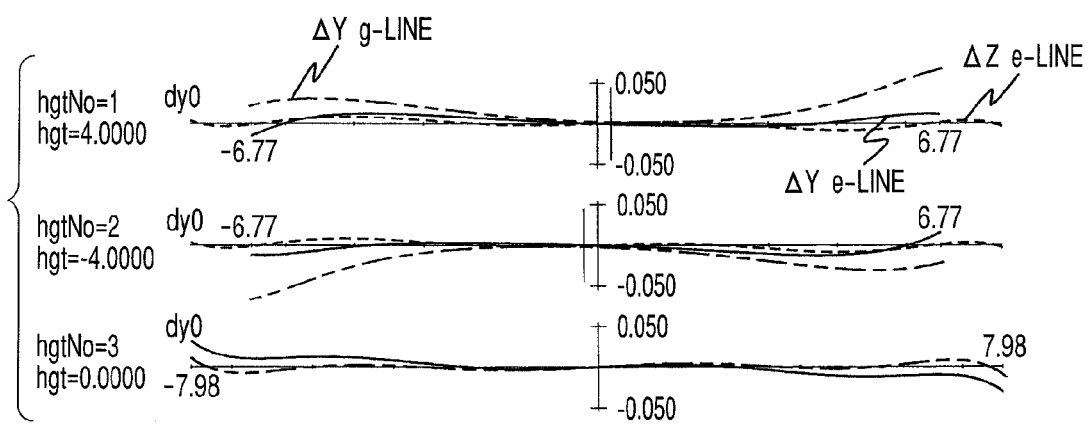
Figure 18C:
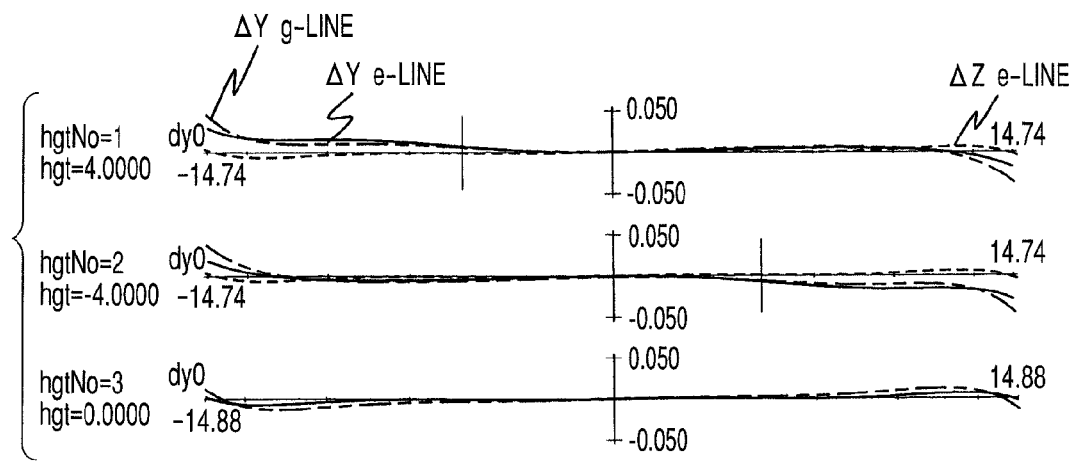

FIGS. 18A, 18B and 18C are lateral aberration charts at the wide angle end (f=8.5 mm), at the middle zoom position (f=31.81 mm), and at the telephoto end (f=119 mm) for the infinite object according to Embodiment 3 of the present invention.

Figure 19:
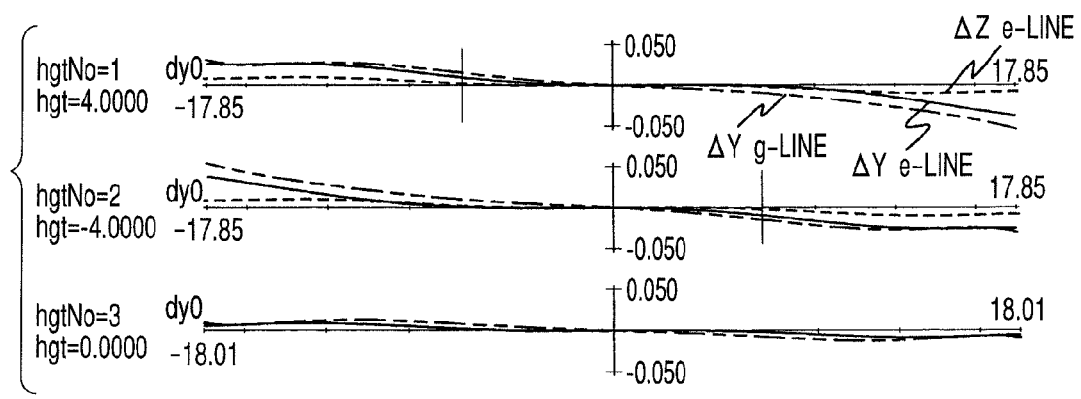
FIG. 19 is a lateral aberration chart at the telephoto end for the object in close proximity according to Embodiment 3 of the present invention.

FIG. 19 is a lateral aberration chart at the telephoto end (f=119 mm) for the object in close proximity (0.8 m) according to Embodiment 3 of the present invention.

Figure 20A:
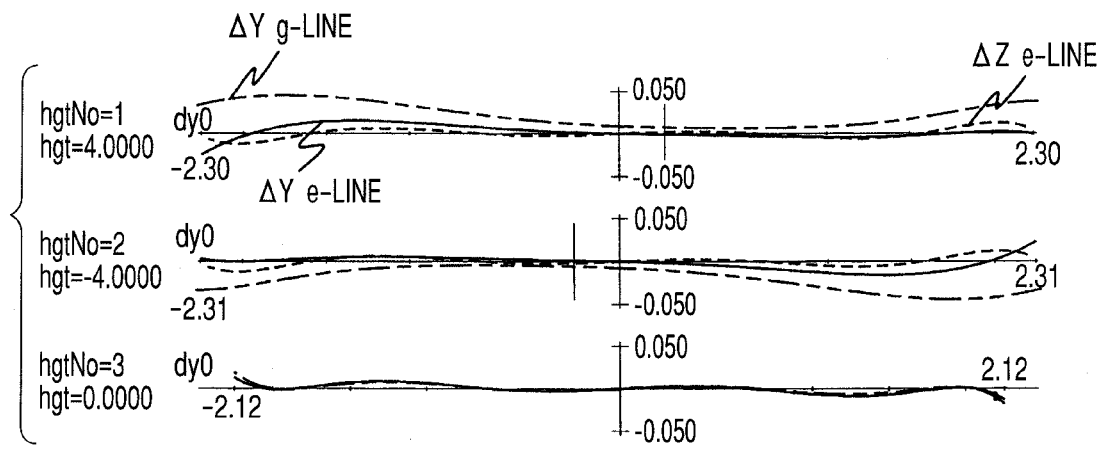
FIGS. 20A, 20B and 20C are lateral aberration charts at the wide angle end, at the middle zoom position, and at the telephoto end for the infinite object when a prism apex angle of a variable apex angle prism is 0.33 degrees according to Embodiment 3 of the present invention.
Figure 20B:
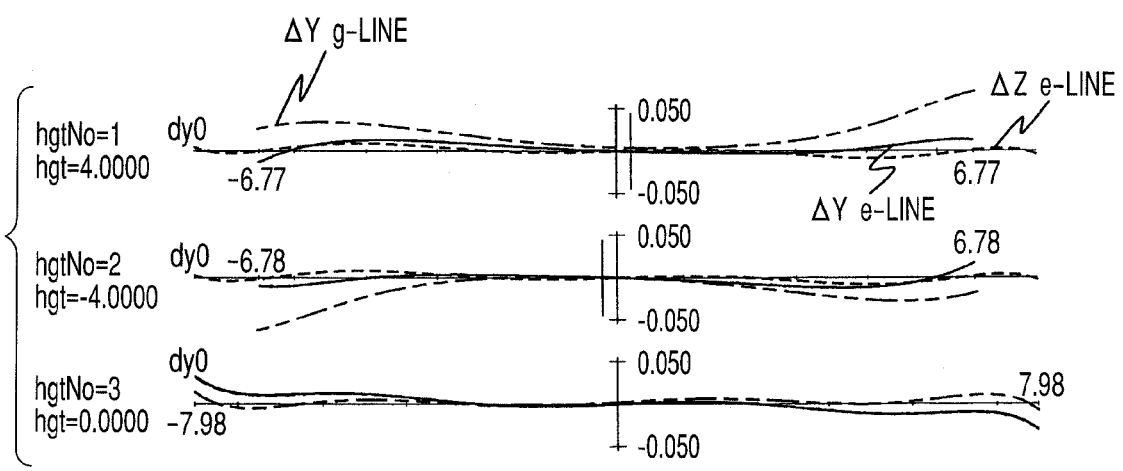
Figure 20C:
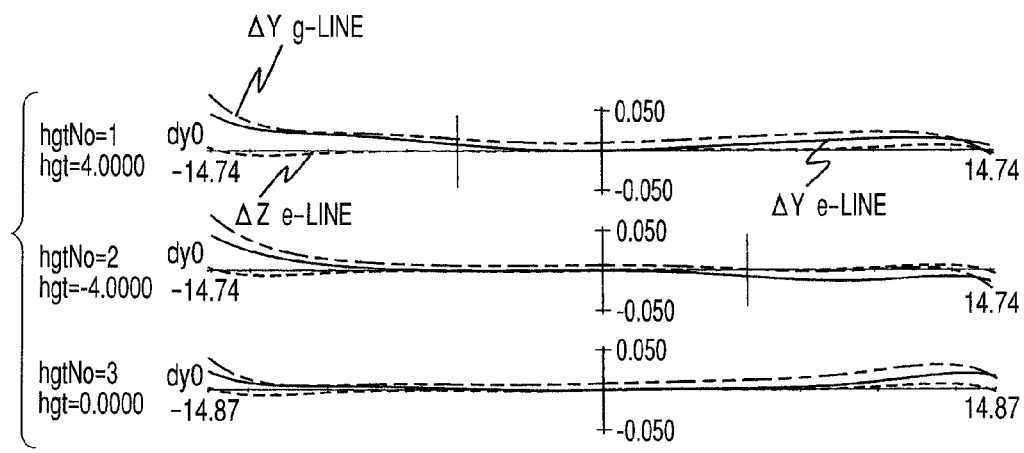

FIGS. 20A, 20B and 20C are lateral aberration charts at the wide angle end (f=8.5 mm), at the middle zoom position (f=31.81 mm), and at the telephoto end (f=119 mm) when the prism apex angle of the variable apex angle prism is 0.33 degrees according to Embodiment 3 of the present invention.

Figure 21:
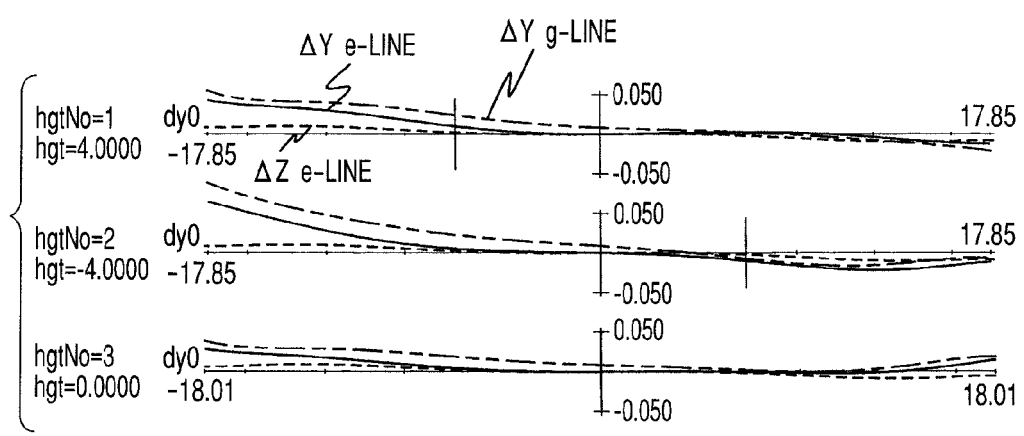
FIG. 21 is a lateral aberration chart at the telephoto end for the object in close proximity when the prism apex angle of the variable apex angle prism is 0.33 degrees according to Embodiment 3 of the present invention.

FIG. 21 is a lateral aberration chart at the telephoto end (f=119 mm) for the object in close proximity (0.8 m) when the prism apex angle of the variable apex angle prism is 0.33 degrees according to Embodiment 3 of the present invention.

Figure 22:
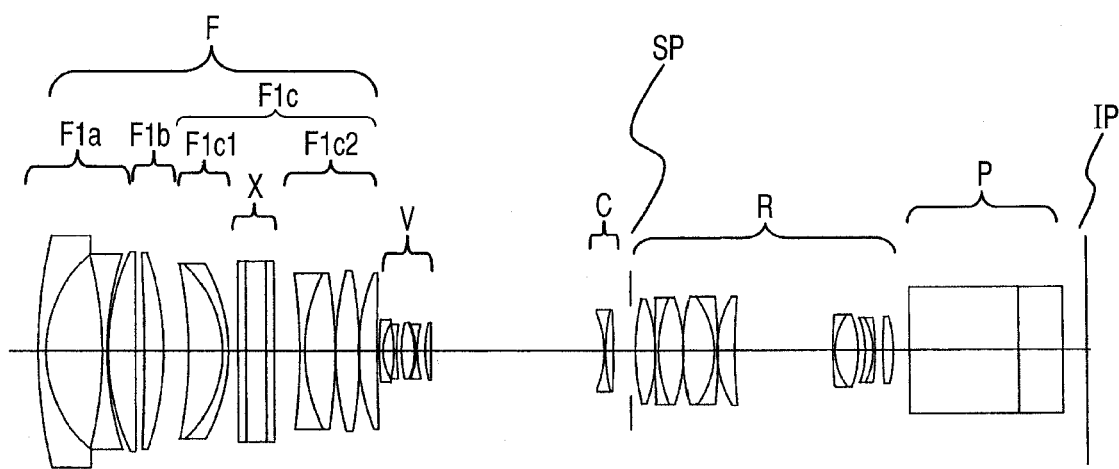
FIG. 22 is a lens cross section at a wide angle end according to Embodiment 4 of the present invention.

FIG. 22 is a lens cross section at a wide angle end according to Embodiment 4 of the present invention.

Figure 23A:
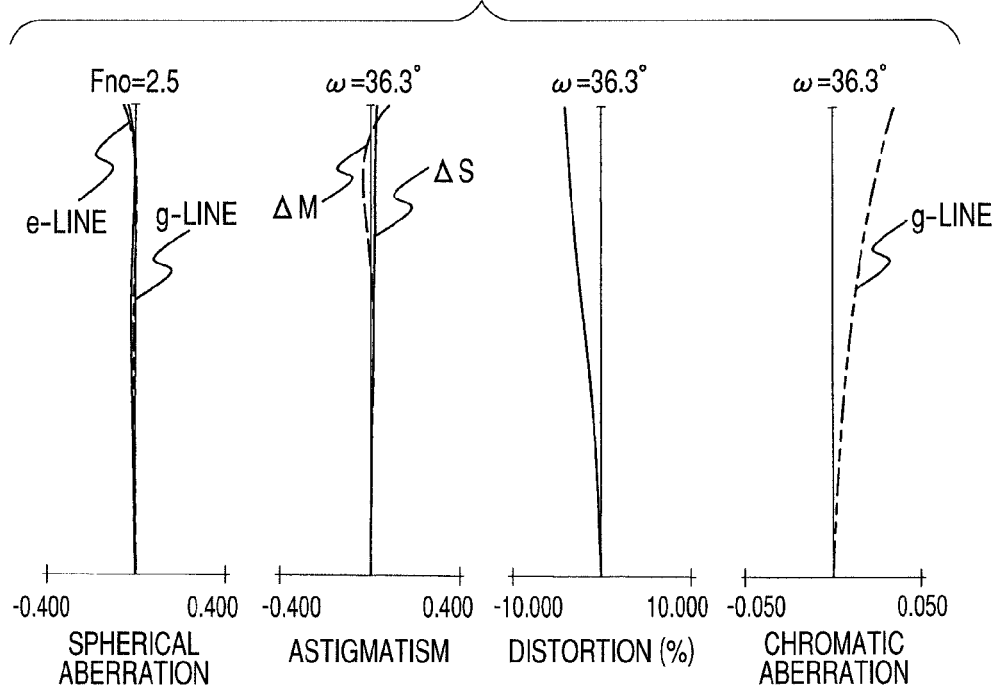
FIGS. 23A, 23B and 23C are longitudinal aberration charts at the wide angle end, at a middle zoom position, and at a telephoto end for an infinite object according to Embodiment 4 of the present invention.
Figure 23B:
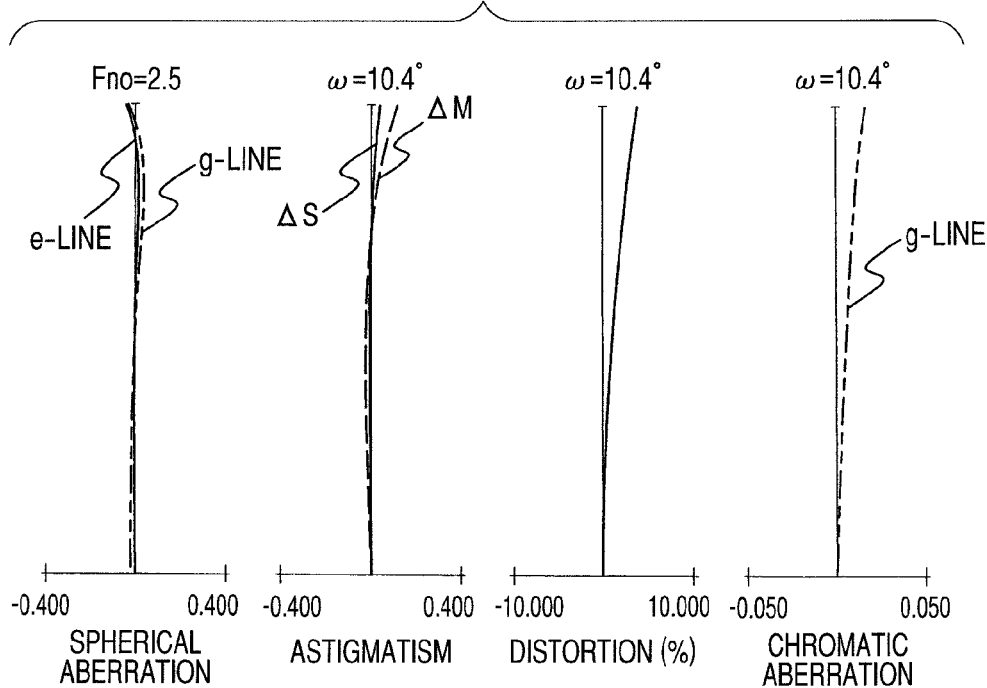
Figure 23C:
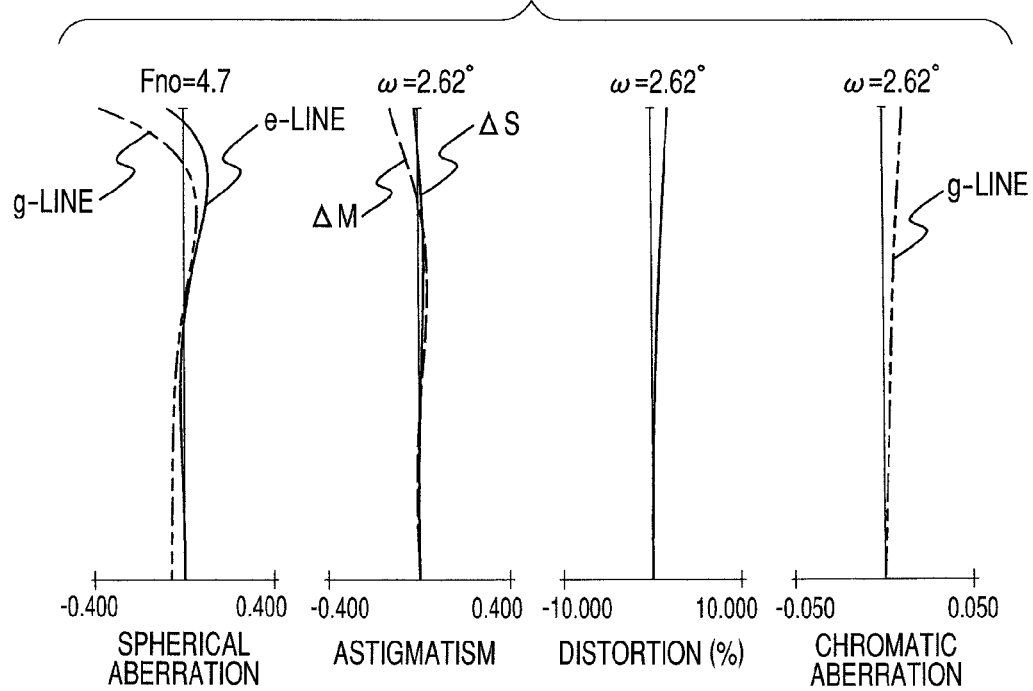

FIGS. 23A, 23B and 23C are longitudinal aberration charts at the wide angle end (f=7.5 mm), at a middle zoom position (f=30 mm), and at a telephoto end (f=120 mm) for an infinite object according to Embodiment 4 of the present invention.

Figure 24:
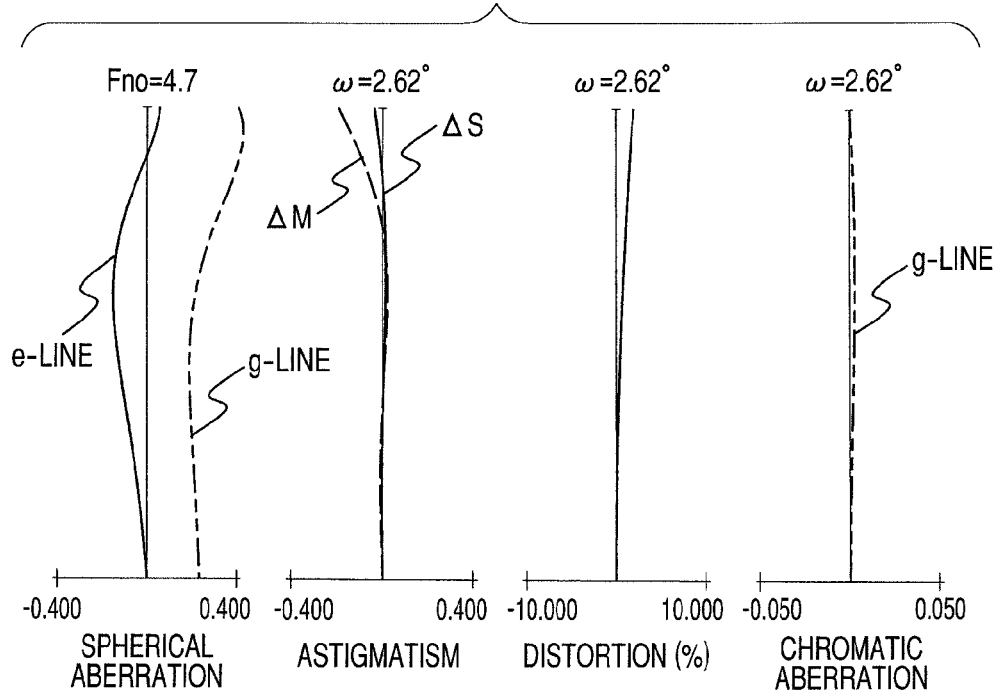
FIG. 24 is a longitudinal aberration chart at the telephoto end for an object in close proximity according to Embodiment 4 of the present invention.

FIG. 24 is a longitudinal aberration chart at the telephoto end (f=120 mm) for an object in close proximity (0.8 m) according to Embodiment 4 of the present invention.

Figure 25A:
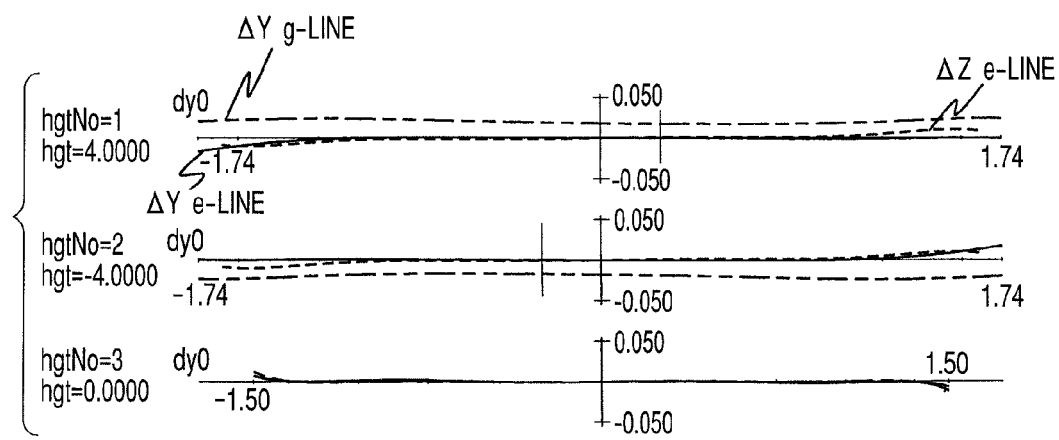
FIGS. 25A, 25B and 25C are lateral aberration charts at the wide angle end, at the middle zoom position, and at the telephoto end for the infinite object according to Embodiment 4 of the present invention.
Figure 25B:
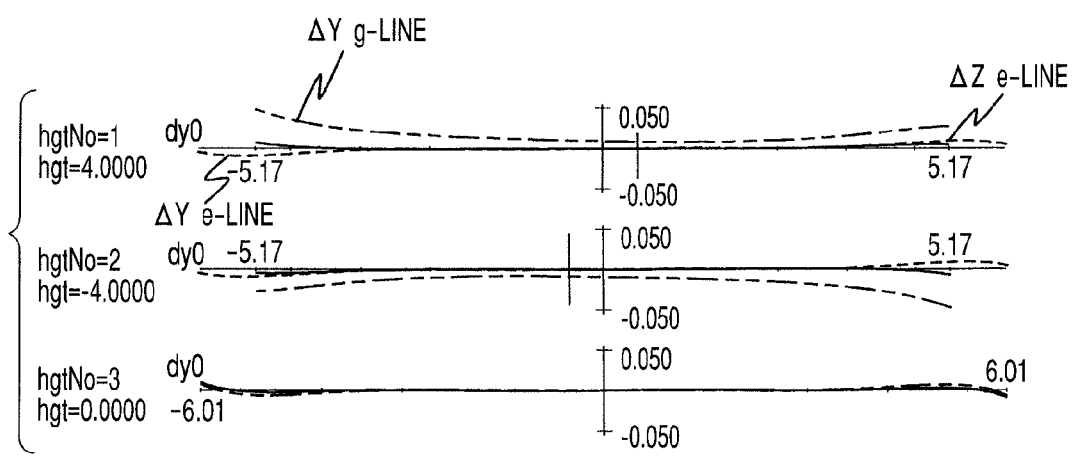
Figure 25C:
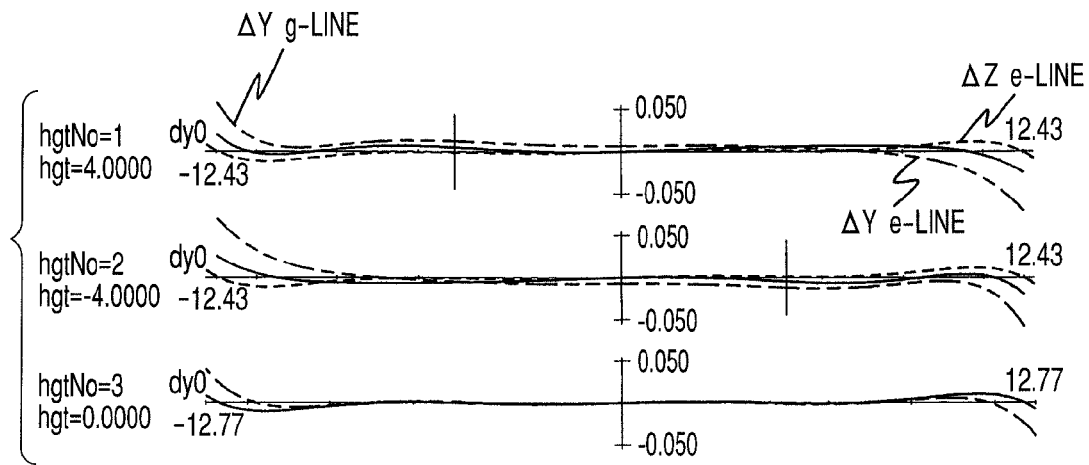

FIGS. 25A, 25B and 25C are lateral aberration charts at the wide angle end (f=7.5 mm), at the middle zoom position (f=30 mm), and at the telephoto end (f=120 mm) for the infinite object according to Embodiment 4 of the present invention.

Figure 26:
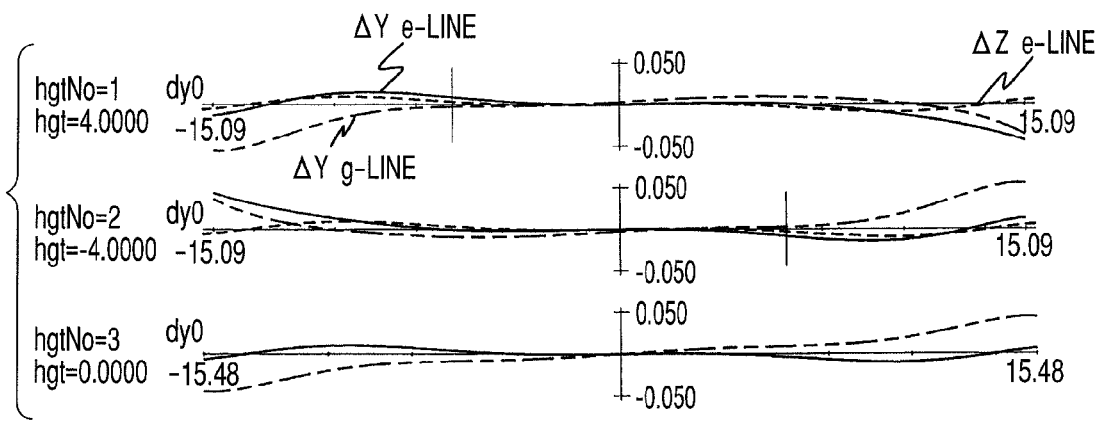
FIG. 26 is a lateral aberration chart at the telephoto end for the object in close proximity according to Embodiment 4 of the present invention.

FIG. 26 is a lateral aberration chart at the telephoto end (f=120 mm) for the object in close proximity (0.8 m) according to Embodiment 4 of the present invention.

Figure 27A:
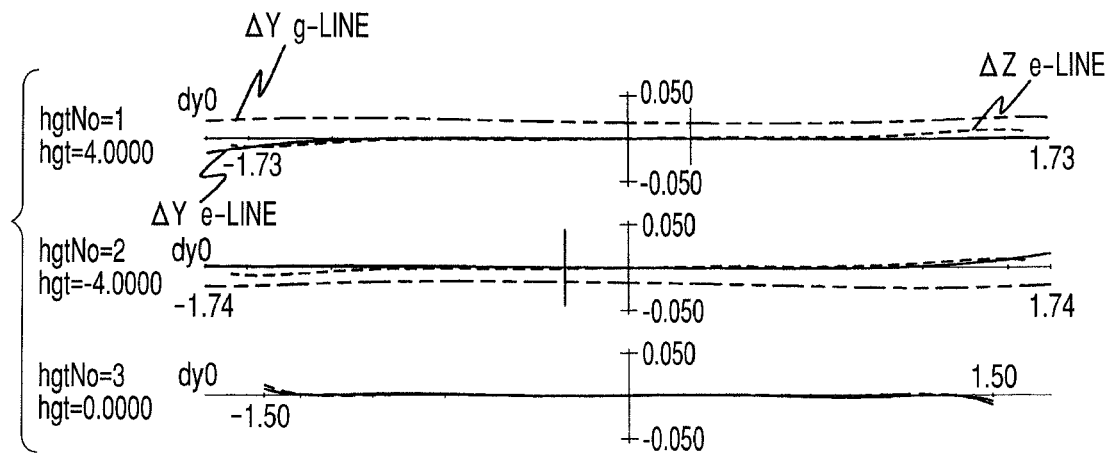
FIGS. 27A, 27B and 27C are lateral aberration charts at the wide angle end, at the middle zoom position, and at the telephoto end for the infinite object when a prism apex angle of a variable apex angle prism is 0.3 degrees according to Embodiment 4 of the present invention.
Figure 27B:
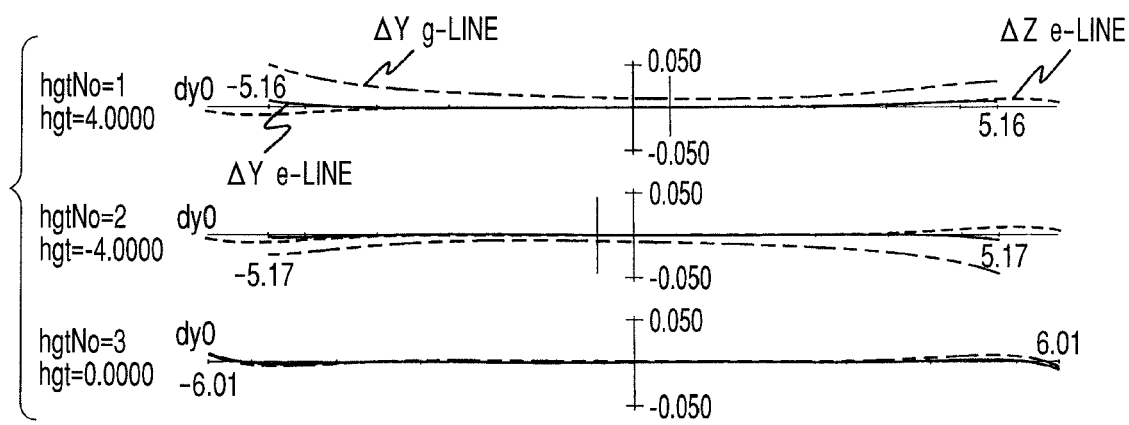
Figure 27C:
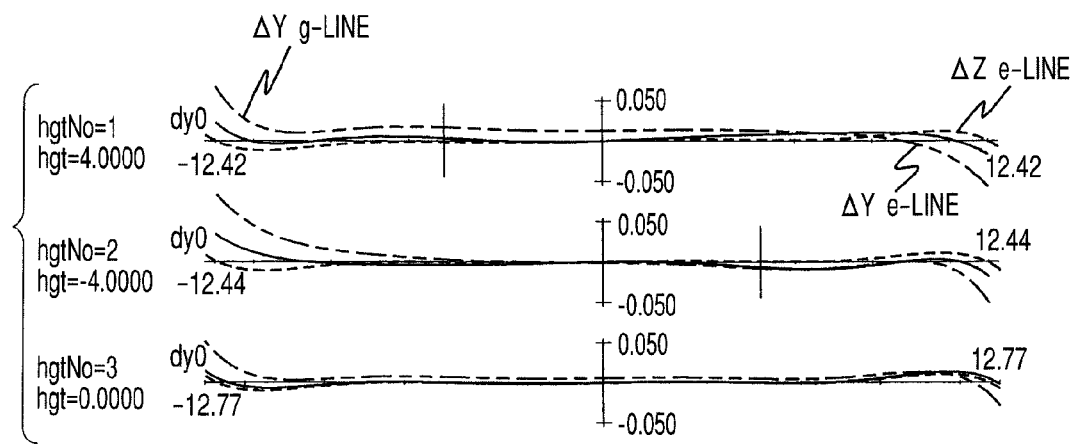

FIGS. 27A, 27B and 27C are lateral aberration charts at the wide angle end (f=7.5 mm), at the middle zoom position (f=30 mm), and at the telephoto end (f=120 mm) when the prism apex angle of the variable apex angle prism is 0.3 degrees according to Embodiment 4 of the present invention.

Figure 28:
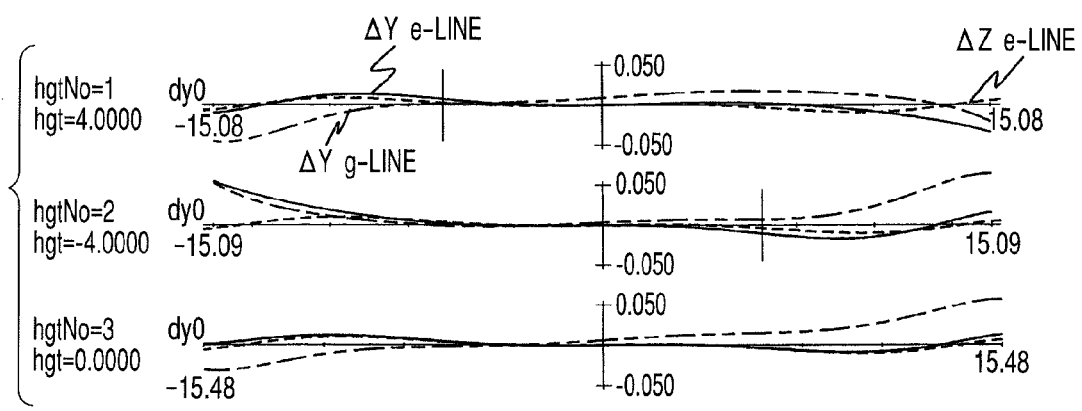
FIG. 28 is a lateral aberration chart at the telephoto end for the object in close proximity when the prism apex angle of the variable apex angle prism is 0.3 degrees according to Embodiment 4 of the present invention.

FIG. 28 is a lateral aberration chart at the telephoto end (f=120 mm) for the object in close proximity (0.8 m) when the prism apex angle of the variable apex angle prism is 0.3 degrees according to Embodiment 4 of the present invention.

Figure 29:
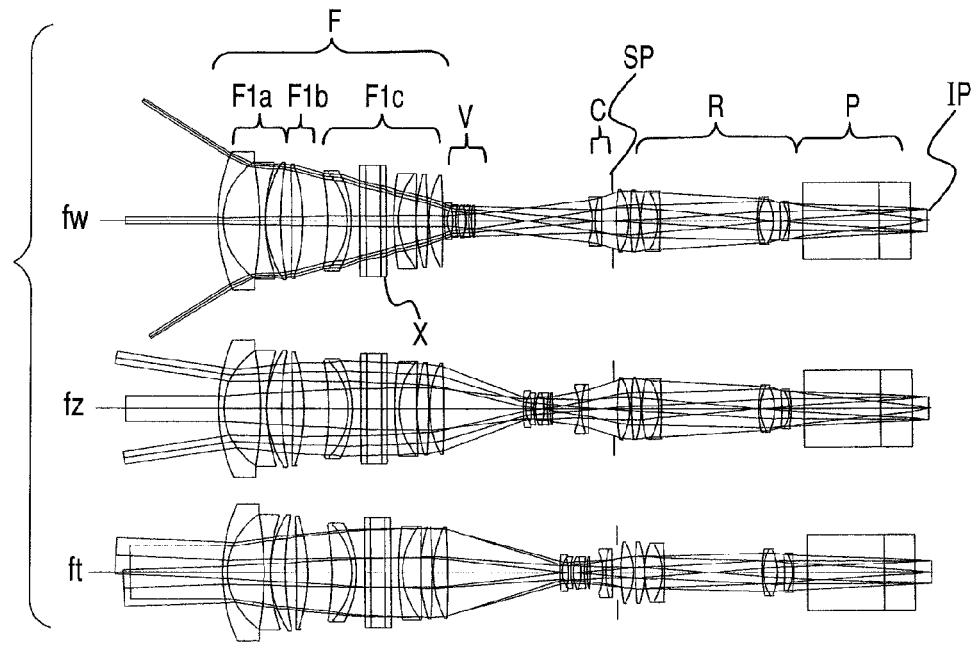
FIG. 29 is an optical path diagram at the wide angle end, at the middle zoom position, and at the telephoto end for the infinite object of FIG. 1.

FIG. 29 is an optical path diagram at the wide angle end (fw), at the middle zoom position (fz), and at the telephoto end (ft) for the infinite object of FIG. 1.

Figure 30:
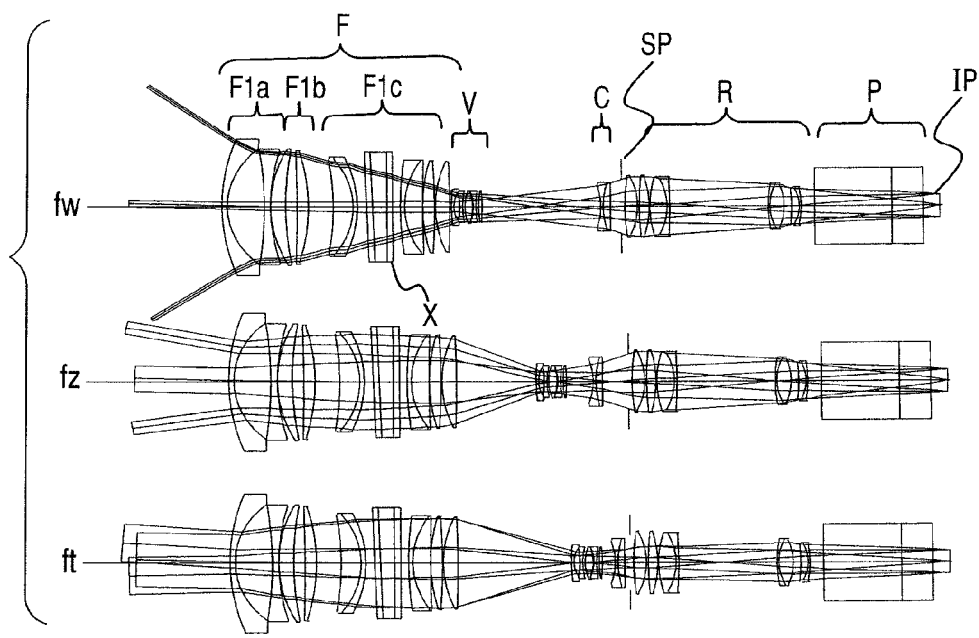
FIG. 30 is an optical path diagram when the prism apex angle of the variable apex angle prism is varied at the wide angle end, at the middle zoom position, and at the telephoto end for the infinite object of FIG. 1.

FIG. 30 is an optical path diagram when the prism apex angle of the variable apex angle prism is varied at the wide angle end (fw), at the middle zoom position (fz), and at the telephoto end (ft) for the infinite object of FIG. 1.

Figure 31:
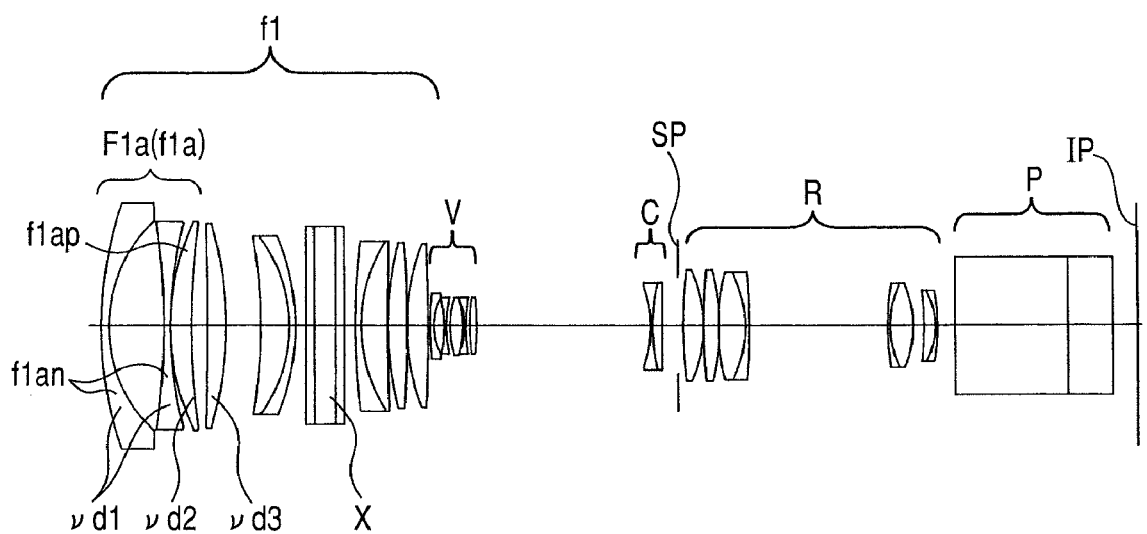
FIG. 31 is a correlation diagram of lens elements, focal lengths and Abbe numbers of materials of a zoom lens system according to the present invention.

FIG. 31 is a correlation diagram of lens elements, focal lengths and Abbe numbers of materials of the zoom lens system according to the present invention.

Figure 32:
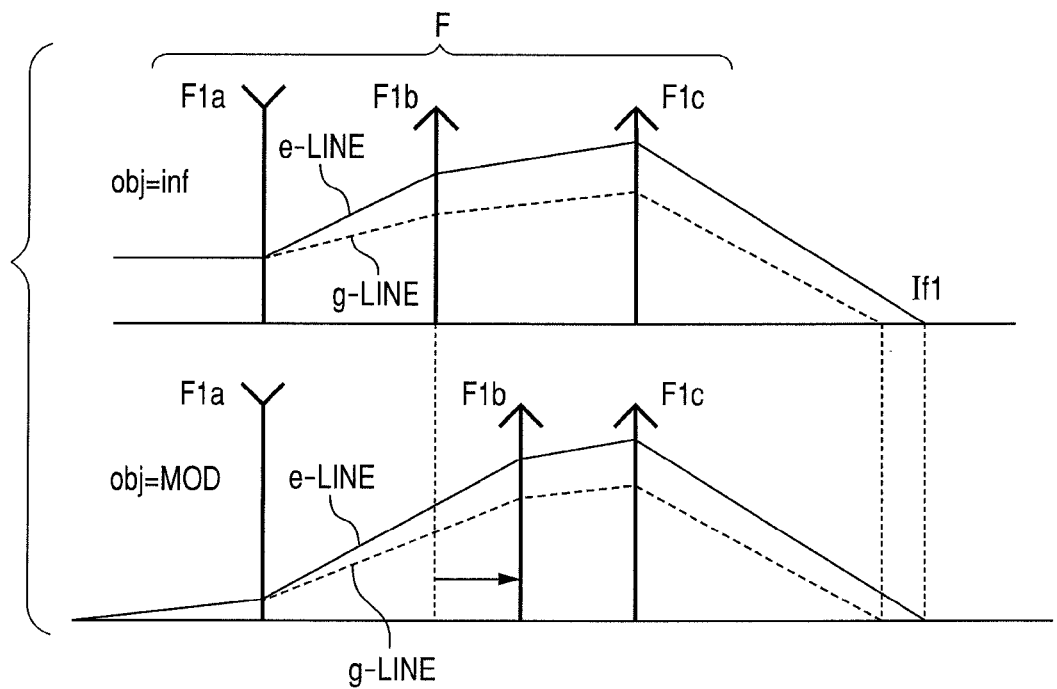
FIG. 32 is an explanatory diagram illustrating a relationship between axial chromatic aberration and focus variation.

FIG. 32 is an explanatory diagram illustrating a relationship between axial chromatic aberration and focus variation.

Figure 33:
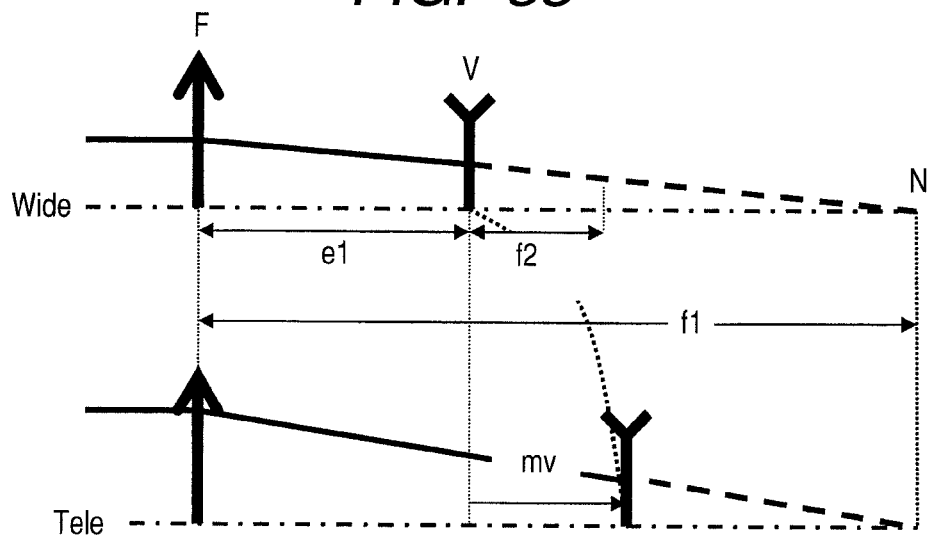
FIG. 33 is a conceptual diagram of optical locations of a first lens unit and a second lens unit at the wide angle end and at the telephoto end in the zoom lens system according to the present invention.

FIG. 33 is a conceptual diagram of optical locations of the first lens unit and the second lens unit at the wide angle end and at the telephoto end in the zoom lens system according to the present invention.

Figure 34:
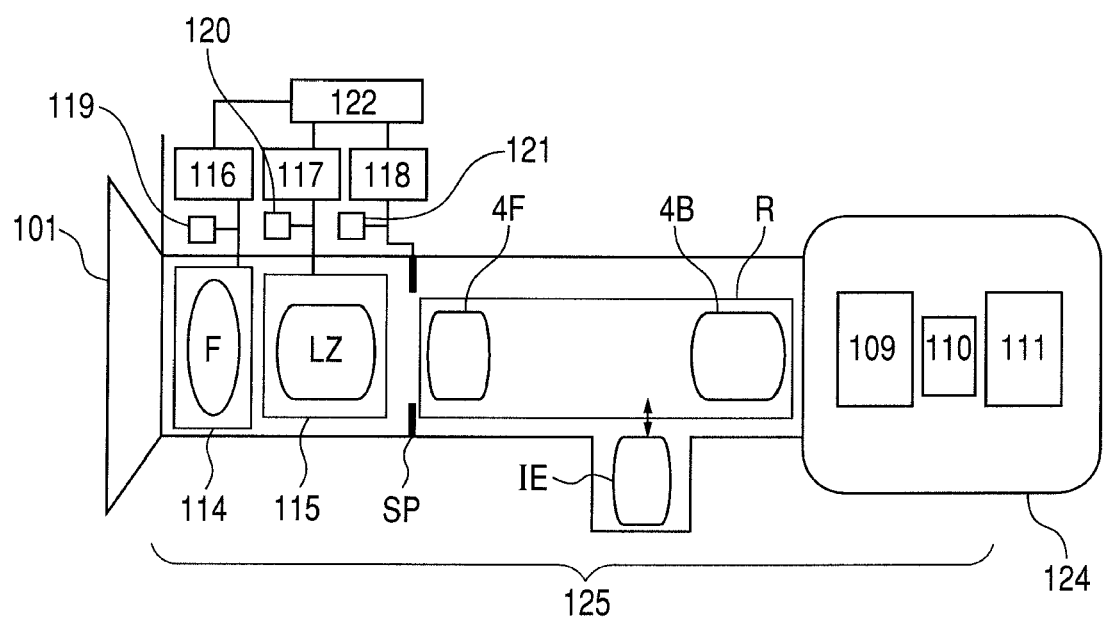
FIG. 34 is a schematic diagram of a main part of a camera according to the present invention.

FIG. 34 is a schematic diagram of a main part of a camera including the zoom lens system according to the present invention.

Next, features of the zoom lens system according to the present invention are described.

In the lens cross section, the zoom lens system includes a first lens unit F that has a positive refractive power and does not move for zooming, and a second lens unit (variator) V that has a negative refractive power and moves for magnification.

Further, the zoom lens system includes a third lens unit (compensator) C having a negative refractive power for compensating for the variation of the position of an image plane accompanying the magnification, an aperture stop SP, a fourth lens unit R for imaging that has a positive refractive power and does not move for zooming, a color separation prism or an optical filter P, which is illustrated as a glass block, and an image plane IP, which corresponds to an imaging plane of a solid-state image pickup element (photoelectric transducer) or the like.

As described above, the zoom lens system of each embodiment is a four-unit zoom lens system constituted by four lens units. The first lens unit F includes a front subunit F1a that has a negative refractive power and does not move for focusing, a middle subunit F1b that has a positive refractive power and moves in the optical axis direction for focusing, and a rear subunit F1c that has a positive refractive power and does not move for focusing.

Further, the first lens unit F includes a variable apex angle prism X that has a variable prism apex angle and is disposed on the image side of the front subunit F1a.

Specifically, the variable apex angle prism is disposed between a rear subunit front part F1c1 and a rear subunit rear part F1c2 which constitute the rear subunit F1c or between the middle subunit F1b and the rear subunit F1c.

The second lens unit V moves on the optical axis toward the image plane monotonously for magnification from the wide angle end to the telephoto end. The third lens unit C moves in a nonlinear manner along a locus convex to the object side for the magnification from the wide angle end to the telephoto end, and hence the variation of the position of the image plane accompanying the magnification is compensated. The second lens unit V and the third lens unit C constitute the variable magnification lens group.

Note that it is possible to dispose in the fourth lens unit R of each embodiment a focal length conversion optical system for changing a focal length range of the entire system, which is insertable in or removable from the optical path.

In the aberration chart, the spherical aberration is illustrated for g-line and e-line. $\Delta M$ and $\Delta S$ denote a meridional image plane and a sagittal image plane. Chromatic aberration of magnification is illustrated for g-line. Fno denotes an f-number, and X denotes a half field angle.

In the lateral aberration chart, cases of image height of 4 mm, −4 mm and 0 mm are illustrated in the diagram from the top.

Further, in the following embodiments, the wide angle end and the telephoto end mean zoom positions when the second lens unit V for the magnification is located at both ends in the movable range after moving mechanically on the optical axis.

First, decentering aberration with respect to the image plane that occurs when a predetermined surface (optical surface such as a lens surface or a flat surface) in the optical system is inclined with respect to the optical axis so that decentering occurs (hereinafter, referred to as image stabilization aberration) is described from a standpoint of the aberration theory based on the method described by the author, Mr. Kimura in the "Optical Society of Japan, Nineteenth Optical Symposium Preprint, Lecture No. 17".

When the v-th surface in the optical system is inclined and decentered by an angle $\epsilon$, an aberration amount $\Delta Y$ (or $\Delta Z$) of the entire system becomes a sum of an aberration amount $\Delta Y0$ (or $\Delta Z0$) before the decentering and an image stabilization aberration amount $\Delta Y(\epsilon)$ (or $\Delta Z(\epsilon)$) generated by the decentering as shown in the equation (a).

Here, the image stabilization aberration amounts $\Delta Y(\epsilon)$ and $\Delta Z(\epsilon)$ are as shown in the equation (b). The equation (b) includes a primary origin movement $\Delta \epsilon$, a primary decentering coma coefficient II$\epsilon$, a primary decentering astigmatism coefficient III$\epsilon$, a primary decentering field curvature coefficient P$\epsilon$, and primary decentering distortion coefficients V$\epsilon_1$ and V$\epsilon_2$. In addition, the equation (b) is expressed with secondary decentering distortion coefficients V$\epsilon^2_1$ and V$\epsilon^2_2$, a secondary decentering astigmatism coefficient III$\epsilon^2$, and a secondary decentering field curvature coefficient p$\epsilon^2$. Further, when the v-th surface is inclined and decentered by an angle $\epsilon$ for the image stabilization, generated decentering chromatic aberration $\Delta Yc(\epsilon)$ is expressed with a decentering chromatic aberration coefficient $\Delta c\epsilon$ as shown in the equation (c).

$$\Delta Y = \Delta Y0 + \Delta Y(\epsilon) \qquad (a)$$
$$\Delta Z = \Delta Z0 + \Delta Z(\epsilon)$$

$$\Delta Y(\epsilon) = -\frac{\epsilon}{2}(\Delta \epsilon) - \frac{\epsilon}{2}[Y'^2\{(2+\cos 2\phi_w)V\epsilon_1 - V\epsilon_2\}] + \qquad (b)$$
$$2(NA)Y'[\{(2\cos(\phi_R - \phi_w) + \cos(\phi_R + \phi_w))III\epsilon + \cos\phi_R\cos\phi_w P\epsilon\} + (NA)^2(2+\cos 2\phi_R)II\epsilon] -$$
$$\frac{\epsilon^2}{2}[Y'\cos\phi_w(3V\epsilon_1^2 - 2V\epsilon_2^2) + (NA)\cos\phi_R(3III\epsilon^2 + P\epsilon^2)]$$

$$\Delta Z(\epsilon) = -\frac{\epsilon}{2}[Y'^2\sin 2\phi_w V\epsilon_1 +$$
$$2(NA)Y'\{(\sin(\phi_R + \phi_w))III\epsilon + \sin\phi_R\sin\phi_w P\epsilon\} +$$
$$(NA)^2\sin 2\phi_R II\epsilon] - \frac{\epsilon^2}{2}[Y'\sin\phi_w V\epsilon_1^2 + (NA)\sin\phi_R(III\epsilon^2 + P\epsilon^2)]$$

$$\Delta Yc(\epsilon) = -\epsilon(\Delta c\epsilon) \qquad (c)$$

Here, NA denotes a numerical aperture of the optical system, $\phi R$ denotes an azimuth angle of a beam on a principal plane on the object side, $\phi \omega$ denotes an azimuth angle between the decentering direction and the Y axis, and Y' denotes an ideal image height. In addition, the respective image stabilization aberration coefficients are expressed by the equations below.

$$(\Delta \epsilon)_v = -2(\alpha_v q_v - \alpha'_v q'_v) \qquad (d)$$

$$(II\epsilon)_v = \qquad (e)$$
$$\left(\alpha_v q_v \sum_{u=1}^{v-1} II_u - \alpha'_v q'_v \sum_{u=1}^{v} II_u\right) - \left(\overline{\alpha_v} p_v \sum_{u=1}^{v-1} I_u - \overline{\alpha'_v} p'_v \sum_{u=1}^{v} I_u\right)$$

$$(III\epsilon)_v = \qquad (f)$$
$$\left(\alpha_v p_v \sum_{u=1}^{v-1} III_u - \alpha'_v q'_v \sum_{u=1}^{v} III_u\right) - \left(\overline{\alpha_v} p_v \sum_{u=1}^{v-1} II_u - \overline{\alpha'_v} p'_v \sum_{u=1}^{v} II_u\right)$$

$$(V\epsilon_1)_v = \left(\alpha_v q_v \sum_{u=1}^{v-1} V_u - \alpha'_v q'_v \sum_{u=1}^{v} V_u\right) - \qquad (g)$$
$$\left(\overline{\alpha_v} p_v \sum_{u=1}^{v-1} III_u - \overline{\alpha'_v} p'_v \sum_{u=1}^{v} III_u\right) + \left(\frac{\overline{\alpha'_v}}{N'_v} - \frac{\overline{\alpha_v}}{N_v}\right)$$

$$(V\epsilon_2)_v = \left(\overline{\alpha_v} p_v \sum_{u=1}^{v-1} P_u - \overline{\alpha'_v} p'_v \sum_{u=1}^{v} P_u\right) + \left(\frac{\overline{\alpha'_v}}{N'_v} - \frac{\overline{\alpha_v}}{N_v}\right) \qquad (h)$$

$$(P\epsilon)_v = \left(\alpha_v q_v \sum_{u=1}^{v-1} P_u - \alpha'_v q'_v \sum_{u=1}^{v} P_u\right) + \left(\frac{\alpha'_v}{N'_v} - \frac{\alpha_v}{N_v}\right) \qquad (i)$$

$$(III\epsilon^2)_v = \alpha'^2_v q'^2_v III_v - 2\alpha_v q'_v \overline{\alpha_v} p'_v II_v + \qquad (j)$$
$$\overline{\alpha'_v}^2 p'^2_v I_v + (\alpha_v q_v - \alpha'_v q'_v)^2 \sum_{u=1}^{v-1} III_u -$$
$$2(\alpha_v q_v - \alpha'_v q'_v)(\overline{\alpha_v} p_v - \overline{\alpha'_v} p'_v) \sum_{u=1}^{v-1} II_u +$$
$$(\overline{\alpha_v} p_v - \overline{\alpha'_v} p'_v)^2 \sum_{u=1}^{v-1} I_u$$

$$(P\epsilon^2)_v = \alpha'^2_v q'^2_v Pv + (\alpha_v q_v - \alpha'_v q'_v)^2 \sum_{u=1}^{v-1} P_u + 2\alpha'_v q'_v \left(\frac{\alpha_v}{N_v} - \frac{\alpha'_v}{N'_v}\right) \qquad (k)$$

-continued $$(V\varepsilon_1^2)_v = \alpha_v'^2 q_v'^2 V_v - 2\alpha_v q_v' \overline{\alpha_v} p_v' III_v + \qquad (l)$$

$$\overline{\alpha_v}^2 p_v'^2 II_v + (\alpha_v q_v - \alpha_v' q_v')^2 \sum_{u=1}^{v-1} V_u -$$

$$2(\alpha_v q_v - \alpha_v' q_v')(\overline{\alpha_v} p_v - \overline{\alpha_v'} p_v') \sum_{u=1}^{v-1} III_u +$$

$$(\overline{\alpha_v} p_v - \overline{\alpha_v'} p_v')^2 \sum_{u=1}^{v-1} II_u$$

$$(V\varepsilon_2^2)_v = \alpha_v' q_v' \overline{\alpha_v'} p_v' P_v - (\alpha_v q_v - \alpha_v' q_v')(\overline{\alpha_v'} p_v' - \overline{\alpha_v} p_v) \sum_{u=1}^{v-1} P_u - \qquad (m)$$

$$\overline{\alpha_v'} p_v' \left( \frac{\alpha_v}{N_v} - \frac{\alpha_v'}{N_v'} \right) + 2\alpha_v' q_v' \left( \frac{\overline{\alpha_v}}{N_v} - \frac{\overline{\alpha_v'}}{N_v'} \right)$$

$$(\Delta c\varepsilon)_v = \qquad (n)$$

$$\left( \alpha_v q_v \sum_{u=1}^{v-1} T_u - \alpha_v' q_v' \sum_{u=1}^{v} T_u \right) - \left( \overline{\alpha_v} p_v \sum_{u=1}^{v-1} L_u - \overline{\alpha_v'} p_v' \sum_{u=1}^{v} L_u \right)$$

Here, $\alpha_v$ denotes an axial ray incident conversion inclination angle on the v-th surface, $\alpha_v'$ denotes an axial ray exit conversion inclination angle on the v-th surface, $\overline{\alpha_v}$ denotes an off-axial ray incident conversion inclination angle on the v-th surface, $\overline{\alpha_v'}$ denotes an off-axial ray exit conversion inclination angle on the v-th surface, $I_v$, $II_v$, $III_v$, $P_v$, $V_v$, $L_v$, $T_v$ . . . denote aberration coefficient share values on the v-th surface, N denotes a refractive index of a medium of the v-th surface on the object side, N' denotes a refractive index of a medium of the v-th surface, p (or p') denotes a distance between an inclination center of the v-th surface and a position of the entrance pupil (or the exit pupil), and q (or q') denotes a distance between an inclination center of the v-th surface and an object plane (or the image plane). Among these variables, the primary origin movement (v$\epsilon$) indicates an image movement caused by the inclination and decentering, and an imaging performance is affected by the various aberration coefficients (II$\epsilon$), (III$\epsilon$), (P$\epsilon$), (V$\epsilon$) and ($\Delta$c$\epsilon$).

In order to reduce occurrence of the image stabilization aberration, it is necessary first to decrease the inclination and decentering amount $\epsilon$ of the variable apex angle prism as shown in the equations (b) and (c).

In addition, each of the image stabilization aberration coefficients shown in the equations (d) to (n) is expressed as a linear combination between the aberration coefficient of the variable apex angle prism and the aberration coefficient of the lens unit on the object side of the variable apex angle prism. Therefore, in order to reduce occurrence of the image stabilization aberration, it is necessary to set the image stabilization aberration amount due to the aberration coefficient of the variable apex angle prism and the image stabilization aberration amount due to the aberration coefficient of the lens units on the object side of the variable apex angle prism with good balance so that they cancel each other. Specifically, it is necessary to set appropriately a location of the variable apex angle prism, the axial and the off-axial ray conversion inclination angles of incidence and exit with respect to the variable apex angle prism, the refractive index and dispersion of the variable apex angle prism, a structure and a power arrangement of the lens units disposed on the object side of the variable apex angle prism, and the like.

In particular, it is necessary to compensate appropriately for primary image stabilization coma shown mainly in the equation (e) in order to remove deterioration of a central image, which is caused by the inclination and decentering of the variable apex angle prism. In addition, it is necessary to compensate appropriately for the primary image stabilization field curvature shown mainly in the equations (f) and (i) in order to compensate appropriately for partial blurring generated simultaneously.

In addition, the above-mentioned conditional expression (n) can be rewritten as shown in the equation (o) below, which includes a contribution term (o-1) of the lens units disposed on the object side of the v-th surface and a contribution term (o-2) of the v-th surface.

$$(\Delta c\varepsilon)_v = \underbrace{(1 - N_v') \left( h_v \sum_{u=1}^{v-1} T_u - \overline{h_v} \sum_{u=1}^{v-1} L_u \right)}_{(o-1)} - \underbrace{N_v' (h_v T_v - \overline{h_v} L_v)}_{(o-2)} \qquad (o)$$

Here, the term (o-1) indicates the contribution term of the lens units disposed on the object side of the variable apex angle prism, the term (o-2) indicates the contribution term of the variable apex angle prism, $N'_v$ denotes a refractive index of the v-th surface, $h_v$ denotes an incident height of the axial paraxial ray on the v-th surface, and $\overline{h_v}$ denotes an incident height of the off-axial paraxial ray on the v-th surface, $\Sigma Lu$ denotes an axial chromatic aberration coefficient share value of the lens unit on the object side of the v-th surface, $\Sigma Tu$ denotes a lateral chromatic aberration coefficient share value of the lens unit on the object side of the v-th surface, $T_v$ denotes a lateral chromatic aberration coefficient of the v-th surface, and $L_v$ denotes an axial chromatic aberration coefficient of the v-th surface.

The image stabilization chromatic aberration coefficient is obtained from the equation (o) as a linear combination of the term relating to the lens units on the object side of the variable apex angle prism and the term relating to the variable apex angle prism. Therefore, it is possible to reduce occurrence of the image stabilization chromatic aberration by controlling so that the above-mentioned aberration coefficient share values cancel each other. Therefore, it is important to appropriately specify the arrangement of the refractive power of the lens element on the object side of the variable apex angle prism and Abbe numbers of the lens elements so as to control the individual chromatic aberration coefficient share values.

Obviously, it is also necessary to compensate for other various aberration values appropriately as a matter of course.

The variable apex angle prism X of this embodiment is constituted by two transparent parallel flat plates and bellows disposed on the periphery thereof defining a space in which a medium that can be deformed, such as liquid having a refractive index higher than that of the parallel flat plates, transparent liquid such as silicone oil or a transparent elastic member (hereinafter, collectively referred to as a "deformable medium"), is filled and enclosed.

Further, at least one of the two parallel flat plates is inclined with respect to the optical axis so that the entire shape is turned from the parallel shape to a wedge-like shape (or a prism shape).

The relative inclination between the two parallel flat plates forms the prism apex angle of the variable apex angle prism.

In addition, a change of the prism apex angle of the variable apex angle prism X may be obtained by inclining the two parallel flat plates in the directions orthogonal to each other. In this case, the change of the prism apex angle can be represented by a combination of vectors of inclinations in the directions orthogonal to each other.

In this embodiment, the prism apex angle of the variable apex angle prism X is changed according to oscillation of the zoom lens system so that the passing ray is deflected by a predetermined quantity. Thus, the shot image is displaced in the direction perpendicular to the optical axis so as to compensate for the blurring of the shot image.

FIG. 29 is an optical path diagram of the zoom lens system according to Embodiment 1 of the present invention at the wide angle end fw, at the zoom position fz, and at the telephoto end ft in the case where the prism apex angle of the variable apex angle prism X is set to be 0 degrees (so as to be parallel flat plates) so that the image stabilization is not performed (hereinafter, referred to as a reference state).

Here, Z denotes a zoom ratio, and the focal lengths of the entire system at the wide angle end and at the telephoto end are denoted by fw and ft, respectively. In this case, the zoom position fz is the middle zoom position, and "fz=fw×$Z^{1/2}$" and "Z=ft/fw" hold.

FIG. 30 shows an optical path diagram of the zoom lens system according to Embodiment 1 of the present invention at the wide angle end fw, at the zoom position fz, and at the telephoto end ft in the case where the parallel flat plates of the variable apex angle prism X are inclined with respect to the optical axis so that the prism apex angle is changed and decentered.

FIG. 31 is an explanatory diagram illustrating a relationship among each lens element, the corresponding focal length, and the Abbe number of the material in the zoom lens system according to the present invention. In the diagram, vd1 denotes an average of the Abbe numbers of the materials of the two negative lens elements in the front subunit F1a.

vd2 denotes the Abbe number of the material of the positive lens element in the front subunit F1a. vd3 denotes the Abbe number of the material of the positive lens element in the middle subunit F1b. f1an denotes a composite focal length of the two negative lens elements in the front subunit F1a. f1ap denotes a focal length of the positive lens element in the front subunit F1a. In addition, a composite focal length of the front subunit F1a is denoted by f1a, and a focal length of the first lens unit F is denoted by f1.

In each embodiment, the front subunit F1a has at least one negative lens element and at least one positive lens element. Here, in the following embodiments, the front subunit F1a includes two negative lens elements and one positive lens element disposed in this order from the object side, but this structure is not a limitation. It is sufficient if one or more negative lens elements and one or more positive lens elements are disposed in this order from the object side. Obviously, it is desirable that the one or more negative lens elements be two or more negative lens elements and that the one or more positive lens elements be one positive lens element for realizing compact design. In addition, it is possible to dispose the negative lens element on the image side of the one or more positive lens elements. In this case, it is desirable that the negative lens element have a low refractive power (have a focal length at least five times, or at least ten times the focal length of the front subunit F1a).

An average Abbe number of the material of the negative lens element in the front subunit F1a is denoted by vd1, and the average Abbe number of the material of the positive lens element in the same is denoted by vd2. In this case, the following condition is satisfied.

$$26 < vd1 - vd2 < 70 \quad (1)$$

Hereinafter, if only a single lens element is used, the average Abbe number and an average refractive index respectively mean the Abbe number and the refractive index of the material of the single lens element.

Further, in each embodiment, the front subunit F1a may include a plurality of positive lens elements. In this case, the Abbe number vd2 is an average value of the Abbe numbers of the materials of the plurality of positive lens elements.

The conditional expression (1) defines a difference between the Abbe numbers of the material of the negative lens element and that of the positive lens element constituting the front subunit F1a so as to define the condition for suppressing the image stabilization chromatic aberration.

If vd1−vd2 is greater than the upper limit of the conditional expression (1), the difference between the Abbe numbers of the material of the positive lens element and that of the negative lens element constituting the front subunit F1a becomes large. As a result, a power of each lens element becomes too small when attempting to achieve the share value of a predetermined chromatic aberration coefficient. Therefore, the total lens length of the front subunit F1a is extended.

If vd1−vd2 is smaller than the lower limit of the conditional expression (1), the difference between the Abbe numbers of the material of the positive lens element and that of the negative lens element constituting the front subunit F1a becomes small. As a result, the power of each lens element in the front subunit F1a becomes so large that it becomes difficult to suppress the image stabilization chromatic aberration and to suppress various high-order aberrations.

Note that it is more preferable in each embodiment to satisfy one or more conditions among the following conditions.

$$30 < vd3 < 63 \quad (2)$$

$$-5 < f1ap/f1a < -1 \quad (3)$$

$$4.3 < f1/fw < 10 \quad (4)$$

$$0.2 < f1/ft < 0.5 \quad (5)$$

$$0.4 < Fno \cdot f1/ff < 3 \quad (6)$$

$$1.3 < Nx < 2 \quad (7)$$

$$30 < vx < 200 \quad (8)$$

$$0.01 < dx/Dx < 0.5 \quad (9)$$

Here, vd3 denotes an average Abbe number of the material of at least one positive lens element included in the middle subunit F1b.

Note that the middle subunit F1b may be constituted by a single positive lens element or may be constituted by a plurality of positive lens elements.

In addition, f1a denotes a focal length of the front subunit F1a, f1ap denotes a composite focal length of the positive lens elements included in the front subunit F1a.

A composite focal length fx is expressed as follows when focal lengths of the plurality of lens elements are denoted by f1, f2, f3 . . . , respectively.

$$\frac{1}{fx} = \frac{1}{f1} + \frac{1}{f2} + \frac{1}{f3} + \dots$$

In addition, f1 denotes a focal length of the first lens unit F when focused at an infinite object, fw denotes a focal length of the entire system at the wide angle end, and ft denotes a focal length of the entire system at the telephoto end.

In addition, Fno denotes an f-number at the telephoto end.

In addition, Nx denotes a refractive index of a deformable medium of the variable apex angle prism X, vx denotes the Abbe number of the variable apex angle prism X. Further, dx denotes a thickness in the optical axis direction of the deformable medium in the reference state. Further, Dx denotes an effective diameter of the variable apex angle prism X.

Here, the reference state means the state where the prism apex angle is 0 degrees so that the image stabilization is not performed.

Next, a technical meaning of the above-mentioned conditional expressions is described.

The conditional expression (2) defines an average value of the Abbe numbers of the materials of the positive lens elements when the middle subunit F1b is constituted by one or more positive lens elements, so as to specify the condition for suppressing axial chromatic aberration variation due to the variation of an object distance on the telephoto side in particular.

Here, if the middle subunit F1b is constituted by a single lens element, the average value means a value of the single positive lens element.

FIG. 32 shows a schematic optical path diagram of individual part systems of the first lens unit F at the telephoto end. In FIG. 32, "obj=inf" indicates the state where the object distance is infinity, and "obj=MOD" (MOD stands for minimum of distance) indicates the state where the object distance is the smallest.

In order to maintain (not to vary substantially) a focal position If1 of the first lens unit F in the state where the object distance is the smallest and in the state where the object distance is infinity, the middle subunit F1b moves to the image side in the optical axis direction.

As illustrated in FIG. 32, the axial ray from the infinite object passing through the front subunit F1a exits the same in a diverging manner, and hence an exit inclination angle becomes negative. In addition, if the front subunit F1a is controlled to have a predetermined chromatic aberration coefficient share value under the condition of the conditional expression (1), the exit inclination angle of the g-line which is the shorter wavelength than the e-line has an absolute value smaller than that of the e-line that is a reference wavelength.

Here, as illustrated in FIG. 32, the incident height of the axial ray reaching the front subunit F1a is lower in the case of an object in close proximity than in the case of the infinite object. Therefore, a difference in exit inclination angle from the front subunit F1a between the e-line and the g-line is smaller in the case of the object in close proximity than in the case of the infinite object.

Therefore, the Abbe number of the material of the positive lens element in the middle subunit F1b is set appropriately so that an imaging position of the g-line is compensated. Thus, the axial chromatic aberration variation can be suppressed when the object distance changes.

If vd3 is larger than the upper limit of the conditional expression (2), the g-line becomes excessively over in close proximity so that appropriate compensation for the axial chromatic aberration becomes difficult.

If vd3 is smaller than the lower limit of the conditional expression (2), the g-line becomes excessively under in close proximity so that appropriate compensation for the axial chromatic aberration becomes difficult.

The conditional expression (3) defines a ratio of the focal length f1a of the front subunit F1a to the composite focal length f1ap of the positive lens element in the front subunit F1a, so as to specify a condition for suppressing the image stabilization chromatic aberration.

If f1ap/f1a is larger than the upper limit of the conditional expression (3), a power of each lens element increases so that high-order aberrations may occur easily. At the same time, a dispersion difference of the material between the positive lens element and the negative lens element of the front subunit F1a becomes small, and hence suppression of the image stabilization chromatic aberration becomes insufficient.

If f1ap/f1a is smaller than Under the lower limit of the conditional expression (3), a power of each lens element is decreased. In order to maintain a short focal distance of the entire system, it is necessary to dispose the lens elements apart from each other. Then, the total lens length is increased, which is not desirable.

The conditional expression (4) defines a ratio of the focal length f1 of the first lens unit F to the focal length fw of the entire system at the wide angle end, so as to specify a condition for achieving a large field angle, small size and weight and high performance.

Next, features of a lens structure of the four-unit zoom lens system including four lens units according to the present invention are described.

Here, focal lengths of the four-group zoom lens system are expressed by the following equations.

$$fw = f1 \beta vw \times \beta cw \times \beta r \quad (\text{o-1})$$

$$ft = f1 \times \beta vt \times \beta ct \times \beta tr \quad (\text{o-2})$$

$$Z = ft/fw = \beta vw/\beta vt \times \beta cw/\beta ct \quad (\text{o-3})$$

Here, fw denotes a focal length of the entire system at the wide angle end, ft denotes a focal length of the entire system at the telephoto end, f1 denotes a focal length of the first lens unit F, $\beta vw$ denotes an imaging zooming factor of the second lens unit V at the wide angle end, $\beta cw$ denotes an imaging zooming factor of the third lens unit C at the wide angle end, $\beta vt$ denotes an imaging zooming factor of the second lens unit V at the telephoto end, $\beta ct$ denotes an imaging zooming factor of the third lens unit C at the telephoto end, and $\beta r$ denotes an imaging zooming factor of the fourth lens unit R.

The imaging zooming factor of the second lens unit V that contributes to the magnification is expressed by the following equations.

$$\beta vw = f2/(f1 - e1 + f2) \quad (\text{p-1})$$

$$\beta vt = f2/(f1 - e1 - mv + f2) \quad (\text{p-2})$$

Here, f2 denotes a focal length of the second lens unit V, e1 denotes a principal point interval between the first lens unit F and the second lens unit V, mv denotes a movement amount from the wide angle end to the telephoto end of the second lens unit V.

In addition, the imaging zooming factor of the fourth lens unit R is expressed by the following equation.

$$\beta r = S'/S \quad (\text{q})$$

Here, S denotes a distance from an object point of the fourth lens unit R to a front principal point position of the fourth lens unit R, S' denotes a distance from an image point of the fourth lens unit R to a rear principal point position of the fourth lens unit R.

In order to achieve a large field angle, a large diameter, high performance, and small size and weight of the zoom lens system, it is necessary to set appropriately the parameters f1, $\beta vw$, $\beta cw$ and $\beta r$ in the equation (o-1).

FIG. 33 is a conceptual diagram of optical arrangements of the first lens unit F and the second lens unit V at the wide angle end (Wide) and at the telephoto end (Tele). Here, e1 denotes a principal point interval between the first lens unit F and the second lens unit V, N denotes an object point position of the second lens unit V (image point position of the first lens unit F).

If f1/fw is greater than the upper limit of the conditional expression (4), the focal length f1 increases so that the effective diameter of the first lens unit F and the total lens length increase. In addition, it becomes difficult to achieve the large field angle as shown in the equation (o-1). In addition, the object point position N of the second lens unit V becomes far as illustrated in FIG. 33. Therefore, the movement amount of the second lens unit V for the magnification increases as shown in the equation (p-2), and hence the entire lens system becomes larger.

In addition, if f1/fw is smaller than the lower limit of the conditional expression (4), it is advantageous for downsizing the entire system. However, the focal length f1 is so small that a curvature of a surface of a lens element constituting the first lens unit F becomes strong. As a result, it becomes difficult to compensate for, in particular, distortion and astigmatism at the wide angle end, and spherical aberration and axial chromatic aberration at the telephoto end.

The conditional expression (5) defines a ratio of the focal length of the first lens unit F to the focal length of the entire system at the telephoto end, so as to specify a condition for achieving both high zooming factor and high performance.

If f1/ft is greater than the upper limit of the conditional expression (5), the object point position N of the second lens unit V becomes far as illustrated in FIG. 33. Therefore, the movement amount of the second lens unit V accompanying the magnification increases as shown in the equation (p-2), and hence the size of the entire lens system is increased.

If f1/ft is smaller than the lower limit of the conditional expression (5), a magnification ratio of the spherical aberration, the axial chromatic aberration and the like generated in the first lens unit F by the variable magnification lens group increases at the telephoto end, which makes it difficult to achieve high performance.

The conditional expression (6) defines the f-number Fno of the entire system at the telephoto end and a ratio of the focal length of the first lens unit F to the focal length of the entire system at the telephoto end, so as to specify a condition for achieving both the large diameter and the small size and weight at the telephoto end.

If Fno·f1/ff is greater than the upper limit of the conditional expression (6), the f-number of the entire system at the telephoto end increases and hence it becomes difficult to achieve the large diameter.

If Fno·f1/ff is smaller than the lower limit of the conditional expression (6), an effective diameter of the rear subunit F1c increases for securing the f-number of the entire system at the telephoto end. Therefore, it becomes difficult to achieve the small size and weight.

The conditional expressions (7) to (9) define a characteristic, a size and the like of the variable apex angle prism X incorporated in the zoom lens system so as to specify conditions for reducing occurrence of the decentering aberration when the image stabilization function is activated with the small size and weight.

The upper limits of the conditional expressions (7) and (8) define the upper limits of the refractive index and the Abbe number of the medium that can endure the use for the variable apex angle prism X.

If Nx and vx are smaller than the lower limits of the conditional expressions (7) and (8), respectively, it becomes difficult to maintain the optical performance in the reference state and to compensate for the primary image stabilization chromatic aberration.

If dx/Dx is greater than the upper limit of the conditional expression (9), the center thickness of the variable apex angle prism X increases so that sizes of the variable apex angle prism X and the entire first lens unit F are increased.

If dx/Dx is smaller than the lower limit of the conditional expression (9), the center thickness of the variable apex angle prism X decreases, which is advantageous for downsizing. However, the maximum variable prism apex angle amount decreases so that an appropriate effect of the image stabilization cannot be obtained.

Further, in each embodiment, it is more preferable to set numeric ranges of the conditional expressions described above as follows.

$$30 < vd1 - vd2 < 50 \tag{1a}$$

$$40 < vd3 < 60 \tag{2a}$$

$$-2.7 < f1ap/f1a < -1.1 \tag{3a}$$

$$4.3 < f1/fw < 5.4 \tag{4a}$$

$$0.27 < f1/ft < 0.42 \tag{5a}$$

$$0.40 < Fno \cdot f1/ft < 2.10 \tag{6a}$$

$$1.4 < Nx < 1.8 \tag{7a}$$

$$50 < vx < 80 \tag{8a}$$

$$0.05 < dx/Dx < 0.25 \tag{9a}$$

The zoom lens system of each embodiment satisfies the various conditions described above so as to appropriately compensate for the aberration over the entire zoom range and the entire focus range in the reference state and in the case where the image stabilization function is activated, thereby obtaining high optical performance.

In particular, according to each embodiment, the entire system has a small size and weight. The zoom ratio is approximately 12 to 20, the field angle at the wide angle end is approximately 60 to 80 degrees, the f-number at the wide angle end is approximately 1.8 to 2.7, and the f-number at the telephoto end is approximately 3.8 to 4.8. Thus, it is possible to provide the zoom lens system that can obtain a high quality image over the entire zoom range and the entire focus range also when the image stabilization function is activated.

Note that at least one of the following structures is preferably satisfied in the present invention.

The first lens unit F includes the front subunit F1a that has a negative refractive power and does not move for focusing, the middle subunit F1b that has a positive refractive power and moves during focusing, and the rear subunit F1c that has a positive refractive power and does not move for focusing.

This arrangement of refractive powers of the first lens unit F enables to achieve the small size and weight of the variable apex angle prism X and the entire lens system. In other words, if the first lens unit F has the structure of a so-called retrofocus type arranging lens units (part systems) having negative, positive and positive refractive powers in this order from the object side to the image side, the rear principal point position of the first lens unit F can be set on the image side with respect to the last surface of the first lens unit F.

As a result, the height of the off-axial ray entering the variable apex angle prism X and the front subunit F1a at the wide angle end can be decreased as illustrated in FIG. 29, and hence the small size and weight can be achieved. In addition, a so-called front lens three-unit inner focus system is adopted so that the middle subunit F1b is moved for focusing, and hence the aberration variations accompanying the focusing, in particular, the spherical aberration variation and the axial chromatic aberration variation can be suppressed at the telephoto end.

The variable apex angle prism is disposed between the middle subunit and the rear subunit or in the rear subunit.

The optical location of the variable apex angle prism X in the first lens unit F is defined in this way, whereby the diameter of the variable apex angle prism X is decreased so that the small size and weight of the entire lens system can be achieved. If the variable apex angle prism X is disposed on the object side of the middle subunit F1b, an effective beam diameter is increased particularly at the wide angle end as illustrated in FIG. 29. Therefore, the size of the variable apex angle prism X is increased.

In addition, if the variable apex angle prism X is disposed on the image side of the rear subunit F1c, a dead space is necessary for the first lens unit F and the second lens unit V. The height of the off-axial ray of the first lens unit F is increased at the wide angle end, and hence the size of the first lens unit F is increased.

The first lens unit F includes at least two negative lens elements and at least two positive lens elements on the object side of the variable apex angle prism.

The lens structure of the first lens unit F on the object side of the variable apex angle prism X is defined in this way. Thus, high performance is achieved over the entire zoom range (total magnification range) and the entire object distance range (entire focus range) also when the image stabilization function is activated.

In order to suppress the decentering aberration when the image stabilization function is activated, it is necessary to set appropriately the share values of the aberration coefficients of the lens units disposed on the object side of the variable apex angle prism X, and the conversion inclination angle of the axial ray and the off-axial ray.

Therefore, it is necessary to set appropriately the lens structure and the power arrangement. If the structure of the first lens unit F is out of the structure described above, it becomes difficult to maintain the optical performance in the reference state and to compensate appropriately for the various aberrations such as the primary image stabilization coma when the image stabilization function is activated.

Next, features of the lens structures in Numerical Embodiments 1 to 4 corresponding to Embodiments 1 to 4 are described.

Numerical Embodiment 1

FIG. 1 is a lens cross section at the wide angle end according to Numerical Embodiment 1 of the present invention.

In Numerical Embodiment 1, the zoom ratio (magnification ratio) is fifteen, the shooting field angle (field angle) 2ω at the wide angle end is 69.02 degrees and the f-number is 2.5 to 4.6.

Hereinafter, the first surface to the twenty-second surface counted from the object side constitute the first lens unit F that has a positive refractive power and does not move for zooming. The first surface to the sixth surface constitute the lens unit (front subunit) F1a that has a negative refractive power and does not move for focusing.

The seventh surface and the eighth surface constitute the lens unit (middle subunit) F1b that has a positive refractive power and moves from the infinite object to the object in close proximity toward the image plane side. A close-up shooting distance is 0.8 m in Numerical Embodiment 1 (where the value is displayed with "mm", and the same is true in the following description). The ninth surface to the twenty-second surface constitute the lens unit (rear subunit) F1c that has a positive refractive power and does not move for focusing. The twenty-third surface to the thirty-second surface constitute the variator (second lens unit) V having a negative refractive power for the magnification, and the variator V moves monotonously on the optical axis toward the image plane side so that the magnification from the wide angle end to the telephoto end can be performed.

The thirty-third surface to the thirty-fifth surface constitute the compensator (third lens unit) C having an action of compensating for a variation of the image point position accompanying the magnification, which moves on the optical axis to the object side along a locus convex in a non-linear manner. The variator V and the compensator C constitute a magnification system (variable magnification lens group).

SP (36) denotes the stop (aperture stop). The thirty-seventh surface to the forty-ninth surface have an imaging action and constitute the relay lens (fourth lens unit) R that has a positive refractive power and does not move for zooming. The fiftieth surface to the fifty-second surface are a color separation prism, an optical filter and the like, which are illustrated as the glass block P in the drawing.

Next, the variable apex angle prism X in this embodiment is described. The variable apex angle prism X corresponds to the twelfth surface to the fifteenth surface, which is disposed between the rear subunit front part F1c1 and the rear subunit rear part F1c2 of the rear subunit F1c. In addition, the variable apex angle prism X is constituted by a parallel flat glass plate, a medium, and a parallel flat glass plate disposed in this order from the object side as described above.

In Numerical Embodiment 1, if a deflection angle (prism apex angle) of the variable apex angle prism X accompanying the image stabilization is 0.3 degrees, a compensation field angle of the ray at the telephoto end is 0.2 degrees.

In Numerical Embodiment 1, the prism apex angle of the variable apex angle prism X changes when the parallel flat plate constituted by the twelfth surface and the thirteenth surface is inclined with respect to the optical axis. The image stabilization chromatic aberration coefficient and conditional corresponding values on the twelfth surface are shown in Table 2, and the image stabilization chromatic aberration coefficient and the conditional corresponding values on the thirteenth surface are shown in Table 3. In addition, a sum of the image stabilization chromatic aberration coefficients on the twelfth surface and the thirteenth surface is shown in Table 4.

Numerical Embodiment 2

FIG. 8 is a lens cross section at the wide angle end according to Numerical Embodiment 2.

In Numerical Embodiment 2, the zoom ratio is fifteen, the field angle 2ω at the wide angle end is 69.02 degrees and the f-number is 2.5 to 4.6.

Hereinafter, the first surface to the twenty-second surface counted from the object side constitute the first lens unit F that has a positive refractive power and does not move for zooming.

The first surface to the sixth surface constitute the lens unit (front subunit) F1a that has a negative refractive power and does not move for focusing. The seventh surface and the eighth surface constitute the lens unit (middle subunit) F1b that has a positive refractive power and moves from the infinite object to the object in close proximity toward the image plane side.

A close-up shooting distance is 0.8 m in Numerical Embodiment 2. The ninth surface to the twenty-second surface constitute the lens unit (rear subunit) F1c that has a positive refractive power and does not move for focusing. The twenty-third surface to the thirty-second surface constitute the variator (second lens unit) V having a negative refractive power for the magnification, and the variator V moves monotonously on the optical axis toward the image plane side so that the magnification from the wide angle end to the telephoto end can be performed.

The thirty-third surface to the thirty-fifth surface constitute the compensator (third lens unit) C having an action of compensating for a variation of the image point position accompanying the magnification, which moves on the optical axis along a locus convex to the object side in a non-linear manner. The variator V and the compensator C constitute a magnification system. SP (36) denotes the stop.

The thirty-seventh surface to the forty-ninth surface have an imaging action and constitute the relay lens (fourth lens unit) R that has a positive refractive power and does not move for zooming. The fiftieth surface to the fifty-second surface are a color separation prism, an optical filter and the like, which are illustrated as the glass block P in the drawing.

The variable apex angle prism X corresponds to the twelfth surface to the fifteenth surface, which is disposed at a position in the rear subunit F1c similar to that of Numerical Embodiment 1. In addition, the structure of the variable apex angle prism X is similar to that of Numerical Embodiment 1.

In Numerical Embodiment 2, if a deflection angle of the variable apex angle prism X accompanying the image stabilization is 0.28 degrees, a compensation field angle at the telephoto end is 0.2 degrees.

In Numerical Embodiment 2, the prism apex angle of the variable apex angle prism X changes when the parallel flat plate constituted by the twelfth surface and the thirteenth surface is inclined with respect to the optical axis. The image stabilization chromatic aberration coefficient and conditional corresponding values on the twelfth surface are shown in Table 2, and the image stabilization chromatic aberration coefficient and the conditional corresponding values on the thirteenth surface are shown in Table 3. In addition, a sum of the image stabilization chromatic aberration coefficients on the twelfth surface and the thirteenth surface is shown in Table 4.

Numerical Embodiment 3

FIG. 15 is a lens cross section at the wide angle end of Numerical Embodiment 3.

In Numerical Embodiment 3, the zoom ratio is fourteen, the field angle 2ω at the wide angle end is 65.82 degrees and the f-number is 2.0 to 4.0. The first surface to the twenty-second surface constitute the first lens unit F that has a positive refractive power and does not move for zooming. The first surface to the sixth surface constitute the lens unit (front subunit) F1a that has a negative refractive power and does not move for focusing.

The seventh surface and the eighth surface constitute a lens unit (middle subunit) F1b that has a positive refractive power and moves from the infinite object to the object in close proximity toward the image plane side. A close-up shooting distance is 0.8 m in Numerical Embodiment 3. The thirteenth surface to the twenty-second surface constitute the lens unit (rear subunit) F1c that has a positive refractive power and does not move for focusing.

The twenty-third surface to the thirty-second surface constitute the variator (second lens unit) V having a negative refractive power for the magnification, and the variator V moves monotonously on the optical axis toward the image plane side so that the magnification from the wide angle end to the telephoto end can be performed.

The thirty-third surface to the thirty-fifth surface constitute the compensator (third lens unit) C having an action of compensating for a variation of the image point position accompanying the magnification, which moves on the optical axis along a locus convex to the object side in a non-linear manner. The variator V and the compensator C constitute a magnification system. SP (36) denotes a stop. The thirty-seventh surface to the fifty-second surface have an imaging action and constitute the relay lens (fourth lens unit) R that has a positive refractive power and does not move for zooming.

The fifty-third surface to the fifty-fifth surface are a color separation prism, an optical filter and the like, which are illustrated as the glass block P in the drawing.

The variable apex angle prism X corresponds to the ninth surface to the twelfth surface, which is disposed between the middle subunit F1b and the rear subunit F1c. The structure of the variable apex angle prism X is similar to that of Numerical Embodiment 1.

In Numerical Embodiment 3, if a deflection angle of the variable apex angle prism X accompanying the image stabilization is 0.33 degrees, a compensation field angle at the telephoto end is 0.2 degrees.

In Numerical Embodiment 3, the prism apex angle of the variable apex angle prism X changes when the parallel flat plate constituted by the ninth surface and the tenth surface is inclined with respect to the optical axis. The image stabilization chromatic aberration coefficient and conditional corresponding values on the ninth surface are shown in Table 2, and the image stabilization chromatic aberration coefficient and the conditional corresponding values on the tenth surface are shown in Table 3. In addition, a sum of the image stabilization chromatic aberration coefficients on the ninth surface and the tenth surface is shown in Table 4.

Numerical Embodiment 4

FIG. 22 is a lens cross section at the wide angle end according to Numerical Embodiment 4 of the present invention.

In Numerical Embodiment 4, the zoom ratio is sixteen, the field angle 2ω at the wide angle end is 72.5 degrees and the f-number is 2.5 to 4.7. The first surface to the twenty-second surface constitute the first lens unit F that has a positive refractive power and does not move for zooming. The first surface to the sixth surface constitute the lens unit (front subunit) F1a that has a negative refractive power and does not move for focusing.

The seventh surface and the eighth surface constitute the lens unit (middle subunit) F1b that has a positive refractive power and moves from the infinite object to the object in close proximity toward the image plane side.

A close-up shooting distance is 0.8 m in Numerical Embodiment 4. The ninth surface to the twenty-second surface constitute the lens unit (rear subunit) F1c that has a positive refractive power and does not move for focusing. The twenty-third surface to the thirty-second surface constitute the variator (second lens unit) V having a negative refractive power for the magnification, and the variator V moves monotonously on the optical axis toward the image plane side so that the magnification from the wide angle end to the telephoto end can be performed.

The thirty-third surface to the thirty-fifth surface constitute the compensator (third lens unit) C having an action of compensating for a variation of the image point position accompanying the magnification, which moves on the optical axis along a locus convex to the object side in a non-linear manner.

The variator V and the compensator C constitute a magnification system. SP (36) denotes the stop. The thirty-seventh surface to the fifty-fourth surface have an imaging action and constitute the relay lens (fourth lens unit) R that has a positive refractive power and does not move for zooming. The fifty-fifth surface to the fifty-seventh surface are a color separation prism, an optical filter and the like, which are illustrated as the glass block P in the drawing.

Next, the variable apex angle prism X in this embodiment is described. The variable apex angle prism X corresponds to the twelfth surface to the fifteenth surface, which is disposed at a position in the rear subunit F1c similar to that of Numerical Embodiment 1. The structure of the variable apex angle prism X is similar to that of Numerical Embodiment 1.

In Numerical Embodiment 4, if a deflection angle of the variable apex angle prism X accompanying the image stabilization is 0.3 degrees, a compensation field angle at the telephoto end is 0.2 degrees.

In Numerical Embodiment 4, the prism apex angle of the variable apex angle prism X changes when the parallel flat plate constituted by the twelfth surface and the thirteenth surface is inclined with respect to the optical axis. The image stabilization chromatic aberration coefficient and conditional corresponding values on the twelfth surface are shown in Table 2, and the image stabilization chromatic aberration coefficient and the conditional corresponding values on the thirteenth surface are shown in Table 3. In addition, a sum of the image stabilization chromatic aberration coefficients on the twelfth surface and the thirteenth surface is shown in Table 4.

Numerical Embodiments 1 to 4 corresponding to Embodiments 1 to 4 of the present invention are described below. In each numerical embodiment, i denotes orders of surfaces counted from the object side, ri denotes a curvature radius of the i-th surface counted from the object side, di denotes an interval between the i-th and the (i+1)th surfaces counted from the object side, and ndi and vdi respectively denote a refractive index and an Abbe number of the i-th optical element.

The focal length, the f-number, and the field angle indicate values when the infinite object is in focus. BF indicates an air-equivalent value of a distance between the last lens surface and the image plane.

The last three surfaces constitute a glass block such as a filter. In addition, relationships between the conditional expressions and the numerical embodiments are shown in Table 1.

<Numerical Embodiment 1>

| Surface number | r | d | nd | vd | Effective diameter |
|---|---|---|---|---|---|
| 1 | 94.650 | 2.10 | 1.77250 | 49.6 | 65.22 |
| 2 | 36.752 | 15.97 | | | 55.44 |
| 3 | −190.229 | 1.85 | 1.77250 | 49.6 | 54.91 |
| 4 | 102.000 | 0.09 | | | 54.26 |
| 5 | 61.224 | 6.01 | 1.92286 | 18.9 | 55.10 |
| 6 | 168.668 | 5.02 | | | 54.53 |
| 7 | −660.854 | 4.92 | 1.50137 | 56.4 | 53.75 |
| 8 | −101.149 | 9.99 | | | 53.38 |
| 9 | −143.427 | 8.15 | 1.49700 | 81.5 | 46.06 |
| 10 | −38.290 | 1.60 | 1.71736 | 29.5 | 46.02 |
| 11 | −59.116 | 3.50 | | | 46.86 |
| 12 | ∞ | 2.50 | 1.51633 | 64.1 | 52.00 |

-continued

<Numerical Embodiment 1>

| 13 | ∞ | 5.80 | 1.41650 | 52.2 | 52.00 |
|---|---|---|---|---|---|
| 14 | ∞ | 2.50 | 1.51633 | 64.1 | 52.00 |
| 15 | ∞ | 3.50 | | | 52.00 |
| 16 | 176.361 | 1.50 | 1.68893 | 31.1 | 44.53 |
| 17 | 40.567 | 7.54 | 1.49700 | 81.5 | 43.46 |
| 18 | 520.175 | 0.15 | | | 43.42 |
| 19 | 83.655 | 5.26 | 1.48749 | 70.2 | 43.42 |
| 20 | −390.810 | 0.15 | | | 43.28 |
| 21 | 56.725 | 6.02 | 1.60311 | 60.6 | 42.85 |
| 22 | −537.545 | (Variable) | | | 42.35 |
| 23 | 98.506 | 1.00 | 1.83481 | 42.7 | 16.42 |
| 24 | 14.784 | 2.97 | | | 14.53 |
| 25 | −36.707 | 0.75 | 1.83481 | 42.7 | 14.37 |
| 26 | 34.012 | 0.84 | | | 14.28 |
| 27 | 24.947 | 3.73 | 1.80518 | 25.4 | 14.61 |
| 28 | −26.633 | 0.41 | | | 14.41 |
| 29 | −20.435 | 0.75 | 1.83481 | 42.7 | 14.33 |
| 30 | 50.127 | 0.99 | | | 14.28 |
| 31 | 54.860 | 1.70 | 1.64769 | 33.8 | 14.49 |
| 32 | −93.515 | (Variable) | | | 14.51 |
| 33 | −31.241 | 0.75 | 1.74320 | 49.3 | 20.39 |
| 34 | 45.029 | 2.88 | 1.80515 | 25.5 | 22.11 |
| 35 | −684.725 | (Variable) | | | 22.68 |
| 36(Stop) | ∞ | 1.50 | | | 26.20 |
| 37 | 100.728 | 5.74 | 1.51633 | 64.1 | 28.05 |
| 38 | −34.413 | 0.20 | | | 28.65 |
| 39 | 164.840 | 4.21 | 1.50127 | 56.5 | 29.00 |
| 40 | −57.087 | 0.20 | | | 29.00 |
| 41 | 54.714 | 7.48 | 1.50127 | 56.5 | 27.95 |
| 42 | −30.663 | 1.00 | 2.00330 | 28.3 | 27.05 |
| 43 | −217.188 | 40.28 | | | 27.04 |
| 44 | 63.829 | 0.80 | 1.83481 | 42.7 | 21.60 |
| 45 | 25.036 | 6.47 | 1.54814 | 45.8 | 21.09 |
| 46 | −29.016 | 3.21 | | | 20.87 |
| 47 | −88.578 | 3.21 | 1.48749 | 70.2 | 17.82 |
| 48 | −19.574 | 0.80 | 1.88300 | 40.8 | 17.24 |
| 49 | −52.436 | 5.19 | | | 17.12 |
| 50 | ∞ | 33.00 | 1.60859 | 46.4 | 36.00 |
| 51 | ∞ | 13.20 | 1.51633 | 64.2 | 36.00 |
| 52 | ∞ | | | | 36.00 |

Various data

| Zoom Ratio | | 15.00 | |
|---|---|---|---|
| | Wide angle | Middle | Telephoto |
| Focal length | 8.00 | 30.98 | 120.00 |
| f-number | 2.50 | 2.50 | 4.60 |
| Field angle | 34.51 | 10.07 | 2.62 |
| Image height | 5.50 | 5.50 | 5.50 |
| Total lens length | 282.85 | 282.85 | 282.85 |
| BF | 41.50 | 41.50 | 41.50 |
| d22 | 0.68 | 33.39 | 47.86 |
| d32 | 50.05 | 11.16 | 5.30 |
| d35 | 4.60 | 10.78 | 2.18 |
| Entrance pupil position | 47.90 | 95.68 | 210.44 |
| Exit pupil position | −217.82 | −217.82 | −217.82 |
| Front principal point position | 55.62 | 122.40 | 266.43 |
| Rear principal point position | −0.86 | −23.84 | −112.86 |

Zoom lens unit data

| Unit | First surface | Focal length | Lens structure length | Front principal point position | Rear principal point position |
|---|---|---|---|---|---|
| 1 | 22 | 42.25 | 94.11 | 56.19 | 23.74 |
| 2 | 32 | −14.00 | 13.15 | 1.25 | −8.50 |
| 3 | 35 | −47.20 | 3.63 | −0.14 | −2.17 |
| 4 | 52 | 42.40 | 126.51 | 30.40 | −110.39 |

| Variable in-focus interval | Infinity | Close proximity (0.8 m from R1 surface) |
|---|---|---|
| d6 | 5.02 | 12.99 |
| d8 | 9.99 | 2.01 |

<Numerical Embodiment 2>

Surface Data

| Surface number | r | d | nd | vd | Effective diameter |
|---|---|---|---|---|---|
| 1 | 626.617 | 2.10 | 1.69680 | 55.5 | 63.65 |
| 2 | 43.369 | 18.11 | | | 55.01 |
| 3 | -164.881 | 1.85 | 1.77250 | 49.6 | 53.42 |
| 4 | 99.926 | 0.13 | | | 53.42 |
| 5 | 67.819 | 5.32 | 1.92286 | 18.9 | 54.41 |
| 6 | 173.326 | 5.04 | | | 54.06 |
| 7 | 331.002 | 9.87 | 1.50137 | 56.4 | 53.68 |
| 8 | -55.526 | 5.00 | | | 53.45 |
| 9 | -61.482 | 7.15 | 1.49700 | 81.5 | 46.93 |
| 10 | -33.919 | 1.60 | 1.71736 | 29.5 | 46.31 |
| 11 | -55.046 | 3.50 | | | 46.60 |
| 12 | ∞ | 2.50 | 1.51633 | 64.1 | 52.00 |
| 13 | ∞ | 5.80 | 1.41650 | 52.2 | 52.00 |
| 14 | ∞ | 2.50 | 1.51633 | 64.1 | 52.00 |
| 15 | ∞ | 3.50 | | | 52.00 |
| 16 | 158.721 | 1.50 | 1.68893 | 31.1 | 46.33 |
| 17 | 44.817 | 9.45 | 1.43875 | 95.0 | 46.12 |
| 18 | -241.117 | 0.15 | | | 46.47 |
| 19 | 76.382 | 5.47 | 1.49700 | 81.5 | 47.33 |
| 20 | 2673.266 | 0.15 | | | 47.14 |
| 21 | 53.747 | 6.90 | 1.60311 | 60.6 | 46.36 |
| 22 | -1332.876 | (Variable) | | | 45.72 |
| 23 | 42.431 | 1.00 | 1.83481 | 42.7 | 17.46 |
| 24 | 14.175 | 2.99 | | | 15.40 |
| 25 | -78.462 | 0.75 | 1.83481 | 42.7 | 15.20 |
| 26 | 25.460 | 0.72 | | | 14.76 |
| 27 | 19.320 | 4.00 | 1.80518 | 25.4 | 14.91 |
| 28 | -32.165 | 0.53 | | | 14.41 |
| 29 | -21.274 | 0.75 | 1.83481 | 42.7 | 14.28 |
| 30 | 30.511 | 0.95 | | | 13.87 |
| 31 | 29.362 | 1.57 | 1.64769 | 33.8 | 14.00 |
| 32 | 112.539 | (Variable) | | | 13.88 |
| 33 | -26.486 | 0.75 | 1.74320 | 49.3 | 17.09 |
| 34 | 31.988 | 3.28 | 1.80515 | 25.5 | 18.64 |
| 35 | 4236.863 | (Variable) | | | 19.39 |
| 36(Stop) | ∞ | 1.50 | | | 25.89 |
| 37 | 101.596 | 5.79 | 1.51633 | 64.1 | 27.74 |
| 38 | -34.478 | 0.20 | | | 28.40 |
| 39 | 238.120 | 4.45 | 1.50127 | 56.5 | 28.80 |
| 40 | -52.150 | 0.20 | | | 28.86 |
| 41 | 50.308 | 7.92 | 1.50127 | 56.5 | 27.81 |
| 42 | -30.017 | 1.00 | 2.00330 | 28.3 | 26.80 |
| 43 | -189.622 | 36.95 | | | 26.81 |
| 44 | 70.854 | 0.80 | 1.83481 | 42.7 | 21.36 |
| 45 | 24.071 | 6.99 | 1.54814 | 45.8 | 20.85 |
| 46 | -27.976 | 2.35 | | | 20.63 |
| 47 | 2059.912 | 3.49 | 1.48749 | 70.2 | 17.90 |
| 48 | -21.315 | 0.80 | 1.88300 | 40.8 | 17.22 |
| 49 | -89.095 | 5.28 | | | 16.95 |
| 50 | ∞ | 33.00 | 1.60859 | 46.4 | 36.00 |
| 51 | ∞ | 13.20 | 1.51633 | 64.2 | 36.00 |
| 52 | ∞ | | | | 36.00 |

Various data

| Zoom Ratio | | 15.00 | |
|---|---|---|---|
| | Wide angle | Middle | Telephoto |
| Focal length | 8.00 | 30.98 | 120.00 |
| f-number | 2.50 | 2.50 | 4.60 |
| Field angle | 34.51 | 10.07 | 2.62 |
| Image height | 5.50 | 5.50 | 5.50 |
| Total lens length | 278.98 | 278.98 | 278.98 |
| BF | 41.41 | 41.41 | 41.41 |
| d22 | 0.72 | 29.25 | 41.80 |
| d32 | 40.93 | 8.71 | 7.20 |
| d35 | 8.60 | 12.29 | 1.25 |
| Entrance pupil position | 44.58 | 84.14 | 178.73 |
| Exit pupil position | -184.27 | -184.27 | -184.27 |
| Front principal point position | 52.25 | 110.11 | 223.43 |
| Rear principal point position | -1.03 | -24.02 | -113.03 |

Zoom lens unit data

| Unit | First surface | Focal length | Lens structure length | Front principal point position | Rear principal point position |
|---|---|---|---|---|---|
| 1 | 22 | 36.10 | 97.58 | 51.96 | 24.22 |
| 2 | 32 | -14.45 | 13.27 | 2.75 | -6.41 |
| 3 | 35 | -38.00 | 4.03 | -0.02 | -2.25 |
| 4 | 52 | 39.54 | 123.92 | 26.56 | -103.42 |

| Variable in-focus interval | Infinity | Close proximity (0.8 m from R1 surface) |
|---|---|---|
| d6 | 5.04 | 5.00 |
| d8 | 7.98 | 2.05 |

<Numerical Embodiment 3>

Surface Data

| Surface number | r | d | nd | vd | Effective diameter |
|---|---|---|---|---|---|
| 1 | 350.757 | 2.15 | 1.58913 | 61.1 | 66.10 |
| 2 | 40.598 | 16.60 | | | 56.09 |
| 3 | -82.360 | 1.85 | 1.58913 | 61.1 | 55.93 |
| 4 | 199.428 | 0.15 | | | 56.54 |
| 5 | 80.645 | 4.62 | 1.92286 | 18.9 | 57.53 |
| 6 | 182.066 | 5.15 | | | 57.17 |
| 7 | -459.835 | 6.17 | 1.58144 | 40.8 | 56.90 |
| 8 | -78.171 | 8.39 | | | 56.84 |
| 9 | ∞ | 2.50 | 1.51633 | 64.1 | 60.00 |
| 10 | ∞ | 5.80 | 1.41650 | 52.2 | 60.00 |
| 11 | ∞ | 2.50 | 1.51633 | 64.1 | 60.00 |
| 12 | ∞ | 4.50 | | | 60.00 |
| 13 | 21209.039 | 7.16 | 1.49700 | 81.5 | 48.89 |
| 14 | -61.436 | 1.60 | 1.72047 | 34.7 | 48.66 |
| 15 | -111.094 | 0.20 | | | 49.19 |
| 16 | 557.031 | 1.60 | 1.71736 | 29.5 | 49.57 |
| 17 | 50.140 | 9.71 | 1.49700 | 81.5 | 49.77 |
| 18 | -212.859 | 0.20 | | | 50.10 |
| 19 | 66.094 | 8.39 | 1.49700 | 81.5 | 51.44 |
| 20 | -202.020 | 0.20 | | | 51.20 |
| 21 | 73.707 | 4.30 | 1.69680 | 55.5 | 49.00 |
| 22 | 235.694 | (Variable) | | | 48.33 |
| 23 | 33.153 | 1.00 | 1.83481 | 42.7 | 21.21 |
| 24 | 14.823 | 4.28 | | | 18.59 |
| 25 | -62.166 | 0.75 | 1.83481 | 42.7 | 18.39 |
| 26 | 34.636 | 0.24 | | | 17.92 |
| 27 | 20.894 | 4.45 | 1.78472 | 25.7 | 18.04 |
| 28 | -52.654 | 0.92 | | | 17.45 |
| 29 | -25.006 | 0.75 | 1.88300 | 40.8 | 17.35 |
| 30 | 37.057 | 1.02 | | | 17.04 |
| 31 | 41.002 | 1.68 | 1.78472 | 25.7 | 17.27 |
| 32 | 236.457 | (Variable) | | | 17.22 |
| 33 | -29.356 | 0.75 | 1.75700 | 47.8 | 21.91 |
| 34 | 41.901 | 3.00 | 1.84666 | 23.8 | 24.31 |
| 35 | -4590.352 | (Variable) | | | 24.84 |
| 36(Stop) | ∞ | 2.00 | | | 30.94 |
| 37 | 331.250 | 4.68 | 1.67003 | 47.2 | 33.07 |
| 38 | -54.688 | 0.20 | | | 33.79 |
| 39 | 188.726 | 5.84 | 1.53172 | 48.8 | 34.98 |
| 40 | -47.948 | 0.20 | | | 35.22 |
| 41 | 78.561 | 9.07 | 1.50127 | 56.5 | 34.10 |
| 42 | -31.884 | 1.40 | 2.00330 | 28.3 | 33.39 |
| 43 | 287.046 | 0.47 | | | 34.10 |
| 44 | 41.291 | 6.35 | 1.64850 | 53.0 | 35.46 |
| 45 | -280.296 | 20.29 | | | 35.14 |
| 46 | 30.205 | 4.88 | 1.48749 | 70.2 | 26.09 |
| 47 | 926.124 | 1.20 | 1.88300 | 40.8 | 24.97 |
| 48 | 23.826 | 6.18 | | | 23.14 |
| 49 | 84.732 | 3.61 | 1.59270 | 35.3 | 23.64 |

<Numerical Embodiment 3>

| | | | | | |
|---|---|---|---|---|---|
| 50 | −99.572 | 5.63 | | | 23.58 |
| 51 | 40.366 | 4.15 | 1.50127 | 56.5 | 23.76 |
| 52 | −335.242 | 5.00 | | | 23.39 |
| 53 | ∞ | 33.00 | 1.60859 | 46.4 | 36.00 |
| 54 | ∞ | 13.20 | 1.51633 | 64.2 | 36.00 |
| 55 | ∞ | (Variable) | | | 36.00 |

Various data

| Zoom Ratio | | 14.00 | |
|---|---|---|---|
| | Wide angle | Middle | Telephoto |
| Focal length | 8.50 | 31.81 | 119.00 |
| f-number | 2.00 | 2.00 | 4.00 |
| Field angle | 32.91 | 9.81 | 2.65 |
| Image height | 5.50 | 5.50 | 5.50 |
| Total lens length | 285.03 | 285.03 | 285.03 |
| BF | 41.67 | 41.67 | 41.67 |
| d22 | 0.74 | 32.18 | 46.57 |
| d32 | 47.00 | 11.04 | 6.97 |
| d35 | 6.87 | 11.39 | 1.07 |
| Entrance pupil position | 48.45 | 95.54 | 199.60 |
| Exit pupil position | | | |
| Front principal point position | 56.72 | 124.11 | 273.29 |
| Rear principal point position | −1.00 | −24.30 | −111.50 |

Zoom lens unit data

| Unit | First surface | Focal length | Lens structure length | Front principal point position | Rear principal point position |
|---|---|---|---|---|---|
| 1 | 22 | 43.02 | 93.74 | 55.33 | 25.56 |
| 2 | 32 | −15.68 | 15.09 | 4.18 | −6.28 |
| 3 | 35 | −42.65 | 3.75 | −0.06 | −2.10 |
| 4 | 55 | 45.31 | 127.37 | 36.67 | −112.74 |

| Variable in-focus interval | Infinity | Close proximity (0.8 m from R1 surface) |
|---|---|---|
| d6 | 5.15 | 8.39 |
| d8 | 10.16 | 3.39 |

<Numerical Embodiment 4>

Surface Data

| Surface number | r | d | nd | vd | Effective diameter |
|---|---|---|---|---|---|
| 1 | 144.917 | 2.15 | 1.72916 | 54.7 | 67.45 |
| 2 | 38.198 | 16.45 | | | 56.55 |
| 3 | −119.059 | 1.85 | 1.77250 | 49.5 | 56.36 |
| 4 | 91.948 | 0.15 | | | 56.58 |
| 5 | 68.573 | 8.09 | 1.92286 | 18.9 | 57.82 |
| 6 | 4302.800 | 2.90 | | | 57.51 |
| 7 | −596.230 | 5.53 | 1.51742 | 52.4 | 56.83 |
| 8 | −92.067 | 7.38 | | | 56.51 |
| 9 | −131.349 | 10.07 | 1.48749 | 70.2 | 50.24 |
| 10 | −35.656 | 1.60 | 1.75520 | 27.5 | 49.51 |
| 11 | −53.175 | 2.96 | | | 50.31 |
| 12 | ∞ | 2.50 | 1.51633 | 64.1 | 52.00 |
| 13 | ∞ | 5.80 | 1.41650 | 52.2 | 52.00 |
| 14 | ∞ | 2.50 | 1.51633 | 64.1 | 52.00 |
| 15 | ∞ | 7.11 | | | 52.00 |
| 16 | −192.114 | 1.60 | 1.71736 | 29.5 | 44.14 |
| 17 | 52.816 | 8.65 | 1.49700 | 81.5 | 44.26 |
| 18 | −152.185 | 0.15 | | | 44.60 |
| 19 | 90.067 | 6.88 | 1.60311 | 60.6 | 46.11 |
| 20 | −138.543 | 0.15 | | | 46.11 |
| 21 | 59.940 | 5.35 | 1.60311 | 60.6 | 44.76 |
| 22 | 611.753 | (Variable) | | | 44.16 |
| 23 | 98.729 | 1.00 | 1.83481 | 42.7 | 17.36 |
| 24 | 15.324 | 3.28 | | | 15.40 |
| 25 | −38.335 | 0.75 | 1.83481 | 42.7 | 15.22 |
| 26 | 70.246 | 1.51 | | | 15.17 |
| 27 | 36.479 | 3.88 | 1.75520 | 27.5 | 15.43 |
| 28 | −21.437 | 0.06 | | | 15.25 |
| 29 | −21.266 | 0.75 | 1.83481 | 42.7 | 15.19 |
| 30 | 30.678 | 2.29 | | | 14.97 |
| 31 | 33.527 | 1.76 | 1.71736 | 29.5 | 15.66 |
| 32 | 1268.673 | (Variable) | | | 15.64 |
| 33 | −30.664 | 0.75 | 1.75700 | 47.8 | 20.88 |
| 34 | 50.523 | 2.35 | 1.84666 | 23.8 | 22.65 |
| 35 | −422.602 | (Variable) | | | 23.02 |
| 36(Stop) | ∞ | 1.50 | | | 26.82 |
| 37 | 64.652 | 5.74 | 1.51633 | 64.1 | 29.15 |
| 38 | −45.207 | 0.20 | | | 29.61 |
| 39 | 6128.545 | 1.00 | 1.83400 | 37.2 | 29.83 |
| 40 | 41.257 | 6.98 | 1.50127 | 56.5 | 29.98 |
| 41 | −49.211 | 0.20 | | | 30.39 |
| 42 | 66.545 | 8.62 | 1.50127 | 56.5 | 30.50 |
| 43 | −27.715 | 1.00 | 1.83400 | 37.2 | 30.17 |
| 44 | −178.317 | 0.13 | | | 30.76 |
| 45 | 31.915 | 5.12 | 1.48749 | 70.2 | 31.15 |
| 46 | 168.460 | 29.05 | | | 30.62 |
| 47 | 108.388 | 0.80 | 1.83481 | 42.7 | 20.11 |
| 48 | 17.619 | 6.67 | 1.54814 | 45.8 | 19.21 |
| 49 | −30.067 | 2.09 | | | 18.97 |
| 50 | −28.191 | 2.21 | 1.49700 | 81.5 | 17.71 |
| 51 | −19.798 | 0.80 | 1.83481 | 42.7 | 17.62 |
| 52 | −71.571 | 2.43 | | | 18.11 |
| 53 | 107.190 | 3.06 | 1.54814 | 45.8 | 18.70 |
| 54 | −41.438 | 5.00 | | | 18.78 |
| 55 | ∞ | 33.00 | 1.60859 | 46.4 | 36.00 |
| 56 | ∞ | 13.20 | 1.51633 | 64.2 | 36.00 |
| 57 | ∞ | | | | 36.00 |

Various data

| Zoom Ratio | | 16.00 | |
|---|---|---|---|
| | Wide angle | Middle | Telephoto |
| Focal length | 7.50 | 30.00 | 120.00 |
| f-number | 2.50 | 2.50 | 4.70 |
| Field angle | 36.25 | 10.39 | 2.62 |
| Image height | 5.50 | 5.50 | 5.50 |
| Total lens length | 294.35 | 294.35 | 294.35 |
| BF | 41.68 | 41.68 | 41.68 |
| d22 | 0.65 | 35.02 | 49.56 |
| d32 | 51.23 | 11.07 | 6.43 |
| d35 | 5.01 | 10.80 | 0.91 |
| Entrance pupil position | 45.66 | 90.37 | 201.39 |
| Exit pupil position | −188.15 | −188.15 | −188.15 |
| Front principal point position | 52.87 | 115.77 | 247.79 |
| Rear principal point position | 0.01 | −22.49 | −112.49 |

Zoom lens unit data

| Unit | First surface | Focal length | Lens structure length | Front principal point position | Rear principal point position |
|---|---|---|---|---|---|
| 1 | 22 | 40.17 | 99.82 | 55.94 | 27.59 |
| 2 | 32 | −14.72 | 15.27 | 1.01 | −11.23 |
| 3 | 35 | −48.03 | 3.10 | −0.20 | −1.90 |
| 4 | 57 | 41.09 | 128.79 | 27.43 | −105.62 |

| Variable in-focus interval | Infinity | Close proximity (0.8 m from R1 surface) |
|---|---|---|
| d6 | 2.90 | 7.38 |
| d8 | 9.69 | 0.60 |

TABLE 1

| Number | Conditional expression | Numerical Embodiment 1 | Numerical Embodiment 2 | Numerical Embodiment 3 | Numerical Embodiment 4 |
|---|---|---|---|---|---|
| (1) | νd1 − νd2 | 30.70 | 33.67 | 42.24 | 33.19 |
| (2) | νd3 | 56.40 | 56.40 | 40.75 | 52.43 |
| (3) | f1ap/f1a | −1.52 | −2.37 | −2.63 | −1.17 |
| (4) | f1/fw | 5.31 | 4.51 | 5.06 | 5.36 |
| (5) | f1/ft | 0.35 | 0.30 | 0.36 | 0.33 |
| (6) | Fno · f1/ft | 1.63 | 1.38 | 1.45 | 1.34 |
| (7) | Nx | 1.42 | 1.42 | 1.42 | 1.42 |
| (8) | νx | 52.20 | 52.20 | 52.20 | 52.20 |
| (9) | dx/Dx | 0.12 | 0.12 | 0.10 | 0.12 |
| | νd1 | 49.60 | 52.57 | 61.14 | 52.09 |
| | νd2 | 18.90 | 18.90 | 18.90 | 18.90 |
| | f1an | −37.31 | −32.24 | −39.67 | −30.77 |
| | f1ap | 100.16 | 116.41 | 151.62 | 74.52 |
| | f1a | −66.02 | −49.16 | −57.66 | −63.55 |
| | ΣT1a | −0.04 | −0.01 | −0.02 | −0.09 |
| | ΣL1a | 0.39 | 0.18 | 0.17 | 0.92 |

TABLE 2

Image stabilization chromatic aberration coefficient and conditional corresponding value

| Condition | Numerical Embodiment 1 | Numerical Embodiment 2 | Numerical Embodiment 3 | Numerical Embodiment 4 |
|---|---|---|---|---|
| ν | 12 | 12 | 9 | 12 |
| ΣT | −0.0182 | 0.0003 | −0.0746 | −0.0686 |
| ΣL | 0.1600 | −0.0106 | 0.7101 | 0.7040 |
| hν | 23.6584 | 25.5043 | 20.9935 | 25.9409 |
| $\bar{h}_\nu$ | −2.3980 | −2.1239 | −2.1823 | −2.3235 |
| Tν | −0.0012 | −0.0024 | −0.0062 | 0.0001 |
| Lν | 0.0647 | 0.0918 | 0.1097 | 0.0569 |
| Nν | 1.5163 | 1.5163 | 1.5163 | 1.5163 |
| Equation (o-1) | 0.0285 | 0.0073 | 0.0086 | 0.0735 |
| Equation (o-2) | 0.1882 | 0.2028 | 0.1669 | 0.2063 |
| (Δcε)ν | −0.1597 | −0.1955 | −0.1584 | −0.1327 |

TABLE 3

Image stabilization chromatic aberration coefficient and conditional corresponding value

| Condition | Numerical Embodiment 1 | Numerical Embodiment 2 | Numerical Embodiment 3 | Numerical Embodiment 4 |
|---|---|---|---|---|
| ν | 13 | 13 | 10 | 13 |
| ΣT | −0.0194 | −0.0021 | −0.0808 | −0.0684 |
| ΣL | 0.2248 | 0.0811 | 0.8198 | 0.7609 |
| hν | 23.7657 | 25.6455 | 21.1865 | 26.0327 |
| $\bar{h}_\nu$ | −2.3500 | −2.1300 | −2.1900 | −2.3200 |
| Tν | 0.0000 | 0.0000 | −0.0010 | 0.0000 |
| Lν | 0.0060 | 0.0080 | 0.0100 | 0.0050 |
| Nν | 1.4165 | 1.4165 | 1.4165 | 1.4165 |
| Equation (o-1) | 0.0067 | 0.0119 | 0.0087 | −0.0013 |
| Equation (o-2) | 0.0162 | 0.0175 | 0.0145 | 0.0178 |
| (Δcε)ν | −0.0095 | −0.0056 | −0.0058 | −0.0191 |

TABLE 4

Sum of image stabilization chromatic aberration coefficients

| Condition | Numerical Embodiment 1 | Numerical Embodiment 2 | Numerical Embodiment 3 | Numerical Embodiment 4 |
|---|---|---|---|---|
| (Δcε) | −0.1692 | −0.2011 | −0.1642 | −0.1518 |

FIG. 34 is a schematic diagram of a main part of a camera (TV camera system) in which the zoom lens system of each embodiment is used as the shooting optical system. In FIG. 34, a zoom lens system 101 according to any one of Embodiments 1 to 4 is provided. A camera 124 is also provided. The zoom lens system 101 is detachable from the camera 124. A camera apparatus 125 is constituted by the camera 124 and the zoom lens system 101 attached to the camera 124.

The zoom lens system 101 includes the first lens unit F, a magnification unit (variable magnification lens group) LZ, and the fourth lens unit R for imaging. The first lens unit F includes a lens unit for focusing. The magnification unit LZ includes the second lens unit V that moves on the optical axis for magnification and the third lens unit C that moves on the optical axis for compensating for an image plane variation accompanying the magnification.

SP denotes the aperture stop. The fourth lens unit R includes a front group 4F, a rear group 4B and a lens unit IE that can be inserted and removed in the optical path.

The lens unit IE changes the focal length range of the entire system of the zoom lens system 101.

Drive mechanisms 114 and 115 such as a helicoid or a cam for driving the first lens unit F and the magnification unit LZ in the optical axis direction are provided.

Motors (drive units) 116 to 118 for electrically driving the drive mechanisms 114 and 115 and the aperture stop SP are further provided.

Detectors 119 to 121 such as an encoder, a potentiometer or a photosensor for detecting positions of the first lens unit F and the magnification unit LZ on the optical axis, and a stop diameter of the aperture stop SP are further provided.

The camera 124 includes a glass block 109 corresponding to an optical filter or a color separation prism, and a solid-state image pickup element (photoelectric transducer) 110 such as a CCD sensor or a CMOS sensor for receiving light of a subject image formed by the zoom lens system 101.

In addition, CPUs 111 and 122 for controlling various drives of the camera 124 and the main body of the zoom lens system 101 are provided.

When the zoom lens system according to the present invention is applied to the TV camera as described above, it is possible to realize the camera having high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-132928, filed May 21, 2008, hereby incorporated by reference herein in its entirety.

What is claimed is:

1. A zoom lens system, comprising, in order from an object side to an image side:
   a first lens unit that has a positive optical power and does not move for zooming, the first lens unit comprising, in order from the object side to the image side:
    a front subunit that has a negative optical power and does not move for focusing;
    a middle subunit that has a positive optical power and moves during the focusing; and
    a rear subunit that has a positive optical power and does not move for the focusing;
a second lens unit that has a negative optical power and moves during the zooming;
a third lens unit that has a negative optical power and moves during the zooming; and
a fourth lens unit that has a positive optical power and does not move for the zooming,
wherein the first lens unit further comprises a variable apex angle prism on the image side of the front subunit,
wherein the front subunit includes at least one negative lens element and at least one positive lens element, and
wherein the following condition is satisfied $$26 < vd1 - vd2 < 70,$$

where vd1 denotes an average Abbe number of material of the at least one negative lens element included in the front subunit, and vd2 denotes an average Abbe number of material of the at least one positive lens element included in the front subunit.

2. A zoom lens system according to claim 1, wherein:
    the middle subunit includes at least one positive lens element; and
    the following condition is satisfied $$30 < vd3 < 63,$$

where vd3 denotes an average Abbe number of material of the at least one positive lens element included in the middle subunit.

3. A zoom lens system according to claim 1, wherein the following condition is satisfied $$-5 < f1ap/f1a < -1,$$

where f1$a$ denotes a focal length of the front subunit, and f1$ap$ denotes a composite focal length of the at least one positive lens element included in the front subunit.

4. A zoom lens system according to claim 1, wherein the following condition is satisfied $$4.3 < f1/fw < 10,$$

where f1 denotes a focal length of the first lens unit when an infinite object is in focus, and fw denotes a focal length of an entire system at a wide angle end.

5. A zoom lens system according to claim 1, wherein the following condition is satisfied $$0.2 < f1/ft < 0.5,$$

where f1 denotes a focal length of the first lens unit when an infinite object is in focus, and ft denotes a focal length of an entire system at a telephoto end.

6. A zoom lens system according to claim 1, wherein the following condition is satisfied $$0.4 < Fno \cdot f1/ft < 3,$$

where f1 denotes a focal length of the first lens unit when an infinite object is in focus, ft denotes a focal length of an entire system at a telephoto end, and Fno denotes an f-number at the telephoto end.

7. A zoom lens system according to claim 1, wherein the following conditions are satisfied:

$$1.3 < Nx < 2;$$

$$30 < vx < 200; \text{ and}$$

$$0.01 < dx/Dx < 0.5,$$

where Nx denotes a refractive index of a deformable medium contained in the variable apex angle prism, vx denotes an Abbe number of the deformable medium, dx denotes a thickness of the deformable medium in an optical axis direction in a reference state, and Dx denotes an effective diameter of the variable apex angle prism.

8. A camera, comprising:
    the zoom lens system according to claim 1; and
    a solid-state image pickup element that receives light of an image formed by the zoom lens system.

* * * * *